(12) United States Patent
Hamilton et al.

(10) Patent No.: US 12,126,763 B2
(45) Date of Patent: Oct. 22, 2024

(54) SYSTEM AND METHOD FOR ENABLING TRUSTED CALLER IDENTITY AND SPOOFED CALL PREVENTION

(71) Applicant: Sevis Systems, LLC, Plano, TX (US)

(72) Inventors: Fletcher Perry Hamilton, Murphy, TX (US); Krishna Kanth Korlepara, Frisco, TX (US); Muhammad Shaiq, Wylie, TX (US); Ronald Christopher Gomez, San Antonio, TX (US)

(73) Assignee: Sevis Systems, LLC, Plano, TX (US)

( * ) Notice: Subject to any disclaimer, the term of this patent is extended or adjusted under 35 U.S.C. 154(b) by 248 days.

(21) Appl. No.: 17/739,498

(22) Filed: May 9, 2022

(65) Prior Publication Data
US 2022/0263942 A1    Aug. 18, 2022

Related U.S. Application Data

(63) Continuation-in-part of application No. 17/091,095, filed on Nov. 6, 2020, now Pat. No. 11,330,098.

(51) Int. Cl.
*H04M 3/42*    (2006.01)
*H04M 1/274*   (2006.01)
(Continued)

(52) U.S. Cl.
CPC ... *H04M 3/42042* (2013.01); *H04M 3/42068* (2013.01); *H04M 3/436* (2013.01); *H04M 1/2757* (2020.01); *H04W 4/20* (2013.01)

(58) Field of Classification Search
CPC .... H04M 3/42042; H04M 1/57; H04M 15/06; H04M 3/42059; H04M 3/436;
(Continued)

(56) References Cited

U.S. PATENT DOCUMENTS 6,308,276 B1   10/2001   Ashdown et al.
6,324,271 B1   11/2001   Sawyer et al.
(Continued)

FOREIGN PATENT DOCUMENTS

CN    104255003 A    12/2014
WO      0174044 A1   10/2001
(Continued)

*Primary Examiner* — Quoc D Tran
(74) *Attorney, Agent, or Firm* — Vincent J. Allen; Jorge Miguel Hernandez; Carstens, Allen & Gourley, LLP

(57) ABSTRACT

A call identification system for verifying telephone calls, the system including a processor in communication with a calling device and a user device. The processor transmits a whitelist to the user device. The whitelist comprises telephone numbers having a label. The processor receives an identification attribute associated a call to the user device. The call is delayed until the calling device receives an acknowledgment from the user device. The processor compares the calling telephone number with each telephone number and generates a notification in response to a match. The processor transmits the notification to the user device, causing the user device to change the label associated with the calling telephone number. The processor receives an acknowledgment from the user device of the label changing and transmits the acknowledgment to the calling device, causing the calling device to launch the call to the user device.

23 Claims, 16 Drawing Sheets

(51) Int. Cl.
*H04M 3/436* (2006.01)
*H04M 1/2757* (2020.01)
*H04W 4/20* (2018.01)

(58) Field of Classification Search
CPC ............ H04M 1/575; H04M 2242/22; H04M 3/42068; H04M 3/42; H04M 3/533; H04M 15/00
See application file for complete search history.

(56) References Cited

U.S. PATENT DOCUMENTS

| | | | |
|---|---|---|---|
| 6,625,273 B1 | 9/2003 | Ashdown et al. | |
| 6,633,756 B1 | 10/2003 | Tett | |
| 6,668,051 B1 | 12/2003 | Ashdown et al. | |
| 6,731,731 B1 | 5/2004 | Ueshima | |
| 6,850,482 B1 | 2/2005 | Ashdown et al. | |
| 6,909,910 B2 | 6/2005 | Pappalardo et al. | |
| 6,993,658 B1 | 1/2006 | Engberg et al. | |
| 6,996,217 B2 | 2/2006 | Goldman | |
| 7,113,577 B2 | 9/2006 | Cook et al. | |
| 7,133,519 B2 | 11/2006 | Ashdown et al. | |
| 7,280,647 B2 | 10/2007 | Henderson | |
| 8,040,875 B2 | 10/2011 | Barclay et al. | |
| 8,085,915 B2 | 12/2011 | Reumann et al. | |
| 8,103,868 B2 | 1/2012 | Christensen | |
| 8,135,119 B1 | 3/2012 | Zhao et al. | |
| 8,144,851 B2 | 3/2012 | Migishima | |
| 8,254,541 B2 | 8/2012 | Cai | |
| 8,320,540 B2 | 11/2012 | Chen | |
| 8,467,512 B2 | 6/2013 | Amir et al. | |
| 8,549,594 B2 | 10/2013 | Lin | |
| 8,655,312 B2 | 2/2014 | Ståhlberg et al. | |
| 8,676,755 B2 | 3/2014 | Sousa et al. | |
| 8,712,390 B2 | 4/2014 | Shah et al. | |
| 8,726,338 B2 | 5/2014 | Narayanaswamy et al. | |
| 8,817,961 B1* | 8/2014 | Sterman | H04M 3/42042 379/207.14 |
| 8,824,664 B1 | 9/2014 | Ristock et al. | |
| 8,861,692 B1 | 10/2014 | Phelps et al. | |
| 8,896,875 B2 | 11/2014 | Shaheen et al. | |
| 8,913,994 B2 | 12/2014 | Edwards et al. | |
| 9,001,985 B2 | 4/2015 | Cox et al. | |
| 9,060,057 B1 | 6/2015 | Danis | |
| 9,077,566 B2 | 7/2015 | Campion et al. | |
| 9,203,954 B1* | 12/2015 | Van Rensburg | H04M 3/42059 |
| 9,277,049 B1 | 3/2016 | Danis | |
| 9,313,328 B2 | 4/2016 | Vendrow et al. | |
| 9,332,119 B1 | 5/2016 | Danis | |
| 9,369,500 B2 | 6/2016 | Sandblad et al. | |
| 9,384,479 B2 | 7/2016 | Larkin | |
| 9,432,506 B2 | 8/2016 | Tatourian et al. | |
| 9,531,695 B2 | 12/2016 | Koppolu et al. | |
| 9,544,440 B2 | 1/2017 | Deng et al. | |
| 9,549,062 B1 | 1/2017 | Yaung et al. | |
| 9,667,782 B2 | 5/2017 | Farrand et al. | |
| 9,686,236 B2 | 6/2017 | Lukin et al. | |
| 9,699,305 B1 | 7/2017 | Compert et al. | |
| 9,706,048 B2 | 7/2017 | Russell | |
| 9,736,300 B2 | 8/2017 | Cook | |
| 9,762,583 B2 | 9/2017 | Guccione et al. | |
| 9,762,728 B1 | 9/2017 | Cox et al. | |
| 9,781,255 B1 | 10/2017 | Gailloux et al. | |
| 9,800,612 B2 | 10/2017 | Harvey et al. | |
| 9,900,431 B1* | 2/2018 | Kreiner | H04M 1/665 |
| 9,942,249 B2 | 4/2018 | Gatti | |
| 9,961,197 B2 | 5/2018 | Kurapati et al. | |
| 10,044,855 B2 | 8/2018 | Tatourian et al. | |
| 10,244,105 B2 | 3/2019 | Prakash et al. | |
| 10,389,877 B2 | 8/2019 | Smith et al. | |
| 10,440,178 B2 | 10/2019 | Gupta et al. | |
| 10,469,670 B2 | 11/2019 | Ballai et al. | |
| 10,659,417 B2 | 5/2020 | Fiatal | |
| 10,659,492 B2 | 5/2020 | Baliga et al. | |
| 10,681,206 B1 | 6/2020 | Kreiner et al. | |
| 10,972,602 B1 | 4/2021 | Lang | |
| 10,992,799 B2* | 4/2021 | Harrison | H04M 7/0012 |
| 11,330,098 B1* | 5/2022 | Hamilton | H04M 3/42042 |
| 2005/0190904 A1 | 9/2005 | Anupam et al. | |
| 2006/0282450 A1 | 12/2006 | Barnes | |
| 2007/116227 A1 | 5/2007 | Vitenson et al. | |
| 2007/0257982 A1 | 11/2007 | Luo et al. | |
| 2008/0176588 A1 | 7/2008 | Ashdown et al. | |
| 2008/0181379 A1* | 7/2008 | Chow | H04L 63/1441 379/142.05 |
| 2008/0219177 A1 | 9/2008 | Flynn et al. | |
| 2009/0097630 A1 | 4/2009 | Fotta | |
| 2009/0310765 A1* | 12/2009 | Denny | H04M 3/42042 379/142.01 |
| 2010/0330960 A1 | 12/2010 | Ravishankar et al. | |
| 2011/0183652 A1 | 7/2011 | Eng et al. | |
| 2011/0294478 A1* | 12/2011 | Trivi | H04M 3/436 455/415 |
| 2012/0220265 A1 | 8/2012 | Liu | |
| 2013/0235724 A1 | 9/2013 | Ashdown et al. | |
| 2013/0243174 A1* | 9/2013 | Denny | H04M 3/42042 379/142.09 |
| 2018/0295235 A1 | 10/2018 | Tatourian et al. | |
| 2019/0306308 A1* | 10/2019 | Mohali | H04M 3/42042 |
| 2020/0045170 A1 | 2/2020 | Gupta et al. | |
| 2020/0137042 A1 | 4/2020 | Kannan et al. | |
| 2022/0239773 A1* | 7/2022 | Garg | H04M 3/2218 |

FOREIGN PATENT DOCUMENTS

| | | |
|---|---|---|
| WO | 0174092 A2 | 10/2001 |
| WO | 2019173546 A1 | 9/2019 |

* cited by examiner

SYSTEM AND METHOD FOR ENABLING TRUSTED CALLER IDENTITY AND SPOOFED CALL PREVENTION

CROSS REFERENCE

This disclosure is a continuation-in-part of U.S. application Ser. No. 17/091,095, filed Nov. 6, 2020, which is hereby incorporated herein by reference in its entirety for all purposes.

BACKGROUND

Technical Field

The present disclosure relates to a telecommunications system that enables trusted caller identification and spoofed call prevention. More particularly, and not by way of limitation, in one embodiment, a pre-call notification can be sent to a user device using an out-of-band communication means that causes the user device to display specifically defined language or images when a call is received from a previously identified calling number indicated in the pre-call notification.

Background

This background section is intended to provide a discussion of related aspects of the art that could be helpful to understanding the embodiments discussed in this disclosure. It is not intended that anything contained herein be an admission of what is or is not prior art, and accordingly, this section should be considered in that light.

No one trusts phone calls or text messages anymore. Millions of unwanted spoofed calls, spoofed text messages, and robocalls bombard users daily. Fraudsters use these calls to gather key pieces of identity information from unsuspecting users to conduct an account takeover or to deceive users into releasing money to the fraudsters.

Businesses and the contact centers that serve their customers have been severely impacted by this trend. Because of the complete lack of trust in phone calls, legitimate phone calls often go unanswered and end up in voicemail purgatory. In addition, these legitimate calls are often blocked without the knowledge of the customer or business, either by the telecom network, the settings of the mobile phone operating system, or a third-party call blocking application.

This can create frustrating situations, for example, when customers call a business for support, are told to expect a call back when it is their turn in line, and never receive it. Another problem occurs when a business needs to speak with a customer to address an urgent issue and cannot get in contact with the customer. This results in businesses frequently having to make multiple attempts to contact their customers, incurring additional operating costs, and customer frustration in the process.

BRIEF SUMMARY

This summary provides a discussion of aspects of certain embodiments of the invention. It is not intended to limit the claimed invention or any of the terms in the claims. The summary provides some aspects but there are aspects and embodiments of the invention that are not discussed here.

The present disclosure is directed to a caller identification system utilizing a server or portal configured to communicate with a first computing device and execute a call acquisition function, or other means capable of monitoring one or more communication networks, for specific transfers of data or information. The first computing device can send a notification with identifying information regarding a trusted call to the portal/server when a call from a specific number is detected. The identifying information can be entered or sent to the portal/server from a CRM system for the calling enterprise or can be entered directly into the portal/server by a business enterprise representative. After receiving the identifying information for one or more trusted calls, the call acquisition function can monitor all calls from an entity or entities to look for calls that match the identifying information. Upon detecting a match, the call acquisition function or other monitoring system can trigger a notification to the first computing device or portal, which in turn can trigger a pre-call notification to the customer device that causes a name and/or other information associated with the caller's number to be stored or modified on the customer device.

Thus, in one aspect, the present disclosure is directed to a method for identifying an incoming call to a customer. A first notification with identifying information regarding a call to be made to a customer is received at a portal from a customer relationship management program, a contact center platform, a backend system, or directly from user input at the portal. Outgoing phone calls from an enterprise voice network can be monitored by a call acquisition function or other monitoring system. When a phone number included in the first notification is matched with a called phone number in an outgoing phone call, a second notification from the portal can be sent to the customer device that is being called. The second notification causes the customer device to display a caller identification notification that indicates the call can be trusted. A record associated with the calling number can be stored on the customer device by either storing the desired name for the enterprise or enterprise contact or by modifying an existing record associated with the enterprise to display the desired name. For example, a contact stored on the user device can be modified to change the contact name from unverified to verified or to add a specific image.

In another aspect, the present disclosure is directed to a computer-implemented method that allows for receiving a purpose for a communication to a customer either from a customer relationship management system or directly from a customer service representative at a portal or other computing device. After the purpose has been populated, a call can be initiated from the voice network by the customer service representative. A call acquisition function, or other monitoring system, can be used to monitor outgoing calls from the enterprise voice network. When an outgoing calling number matches a number on an enterprise spoof prevention list, the call acquisition function can trigger a notification to the portal. The enterprise spoof prevention list is the list of phone numbers that are used as calling numbers from the enterprise to contact customers. The portal, upon reception of the notification from the call acquisition function, triggers a pre-call notification about the pending arrival of a verified call to the app on the customer phone. The pre-call notification can include the purpose of the call and can also cause the purpose and a desired name or image to be displayed on the customer's phone when the call arrives. This can be accomplished, for example, by using the pre-call notification message to temporarily change the contact name associated with the calling number in the customer's phone from unverified call to verified call, or to add a specific image, for example. After the call is made, the contact name can be changed back to its original state or deleted from the contact list. The contact is created prior to the call arrival and deleted upon a security notification from the portal. The security notification is about indicating to the mobile app on the phone that window of receiving the legitimate call is closed and the created contact shall be deleted. This is to protect the customer from being spoofed utilizing the same enterprise calling number.

In another aspect, the present disclosure is directed to a call identification system for verifying telephone calls. The call identification system may comprise a processor in communication with a calling device and a user device. The processor may receive an identification attribute associated with the calling device triggering a call to the user device. The identification attribute may comprise information associated with the calling device. The information associated with the calling device may include a calling telephone number. Optionally, the call may be delayed until the calling device receives an acknowledgment from the user device.

The processor may compare the calling telephone number with a plurality of telephone numbers stored on the user device. A first label is associated with each of the plurality of telephone numbers. The processor may generate a first notification in response to the calling telephone number matching with one of the plurality of telephone numbers. The processor may transmit the first notification to the user device, which may cause the user device to change the first label associated with the calling telephone number to a second label. Optionally, the processor may further receive an acknowledgment from the user device of the first label changing to the second label. After receiving the acknowledgment, the processor may transmit the acknowledgment to the calling device, which may cause the calling device to launch the call to the user device. The user device may display the second label upon receiving the call.

In yet another aspect, the present disclosure is directed to a method for using a server to verify telephone calls between a calling device and a user device. The method includes the step of receiving, in response to the calling device triggering a call to the user device, an identification attribute from the calling device. The identification attribute comprises information associated with the calling device. The information associated with the calling device includes a calling telephone number. Optionally, the call is delayed until the calling device receives an acknowledgment from the user device.

The method further includes the steps of comparing the calling telephone number with each of a plurality of telephone numbers stored on the user device. A first label is associated with each of the plurality of telephone numbers. The method also includes the step of generating a first notification in response to the calling telephone number matching one of the plurality of telephone numbers. The method further includes the step of transmitting the first notification to the user device, thereby causing the user device to change the first label associated with the calling telephone number to a second label. Optionally, the method includes the step of receiving an acknowledgment from the user device of the first label changing to the second label and transmitting the acknowledgment to the calling device. The calling device launches the call to the user device upon receiving the acknowledgment and the user device displays the second label upon receiving the call.

Other aspects of the present disclosure will become apparent from the following detailed description when considered in conjunction with the accompanying figures. In the figures, each identical, or substantially similar component that is illustrated in various figures is represented by a single numeral or notation. For purposes of clarity, not every component is labeled in every figure. Nor is every component of each aspect of the present disclosure shown where illustration is not necessary to allow those of ordinary skill in the art to understand the disclosure.

It is to be understood that both the foregoing general description and the following detailed description are exemplary and are intended to provide further explanation of the disclosed embodiment and subject matter as claimed.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will be best understood by reference to the following detailed description of illustrative embodiments when read in conjunction with the accompanying drawings, wherein:

DETAILED DESCRIPTION

Figure 1:
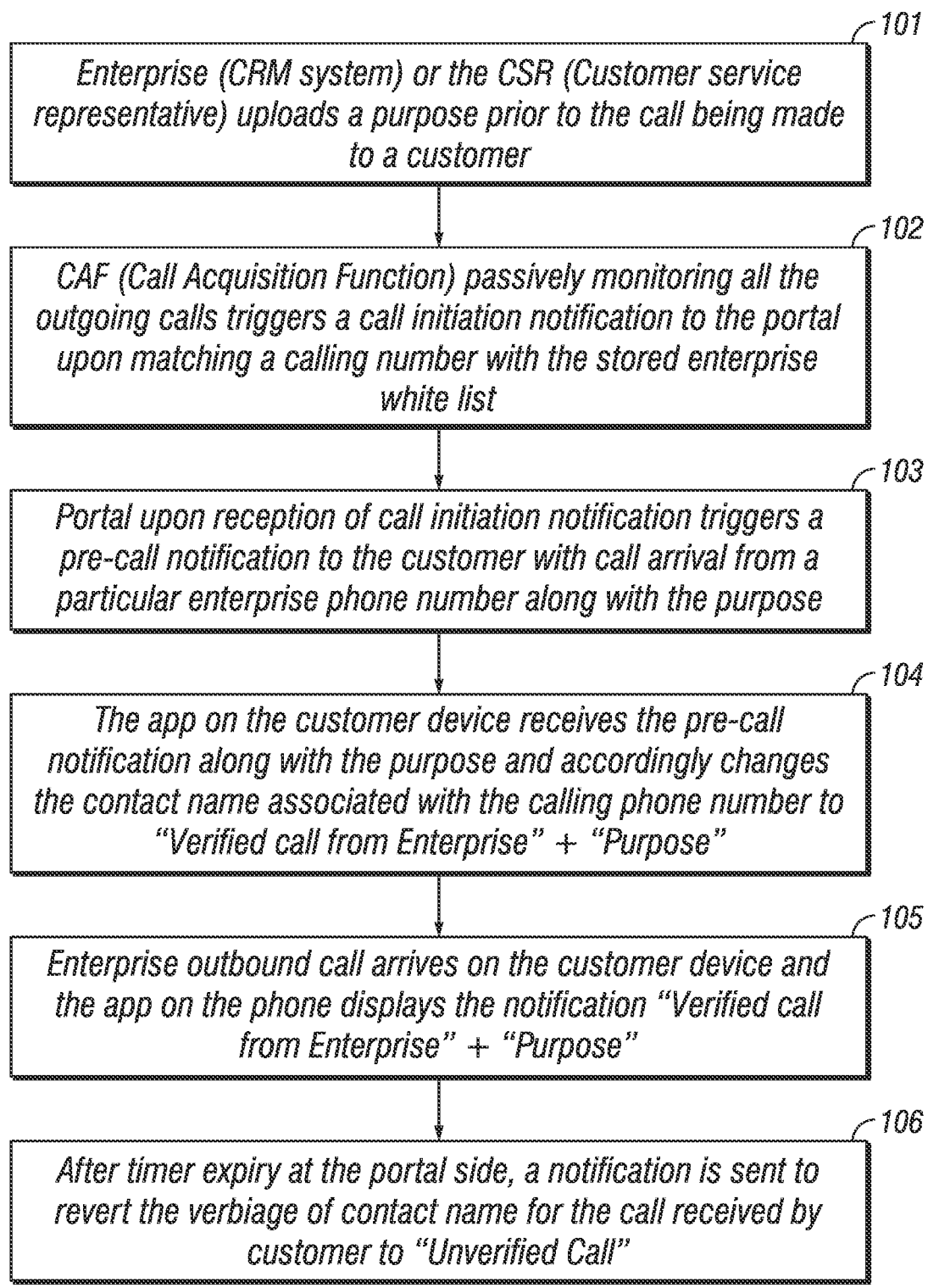
FIG. 1 is a flowchart of a method for caller identity verification in accordance with an embodiment of the disclosure.

Embodiments of the disclosure will now be described. One example of the present disclosure includes a user device receiving a spoof prevention list of phone numbers belonging to one or more enterprises, businesses, or stores. While enterprises, businesses, or stores are discussed within this disclosure, it would be understood that these could represent any calling entity desiring a method of enabling trust in a caller identification, whether said entity is currently in existence or becomes available later.

In at least one example, a spoof prevention list may be a contact list or other data set including contact information that is not blocked from making or completing calls to the user device. The spoof prevention list stores into the user device's local contacts at least one contact name with a predefined name such as "Unverified caller," "Unverified call," or similar name or image that would indicate to the user that a call has not been verified. Before making a call to the user, an enterprise or store representative may define the purpose of the call which is to be made by sending or assigning the verbiage to the user's phone number on a portal located within the enterprise's voice or network system. When the call is placed, a call acquisition function used to monitor outgoing calls can detect the call made from a pre-defined enterprise number, triggering a message to the portal. Alternatively, a message can be sent to the portal directly by the store representative or a CRM system at the time the call is placed.

The portal can conduct an analysis of the call or call information by matching a calling number on a spoof prevention list to a call that has been placed from an enterprise calling number to the user's phone number associated with a user device. If a match is found, the portal can send a pre-call notification, or in some examples a call initiation notification, to the user device indicating the purpose of the impending call previously stored at the portal. The notification may include verbiage that was assigned by the enterprise or store representative, or selected text or data from a predefined notification list. The user device, upon receiving the pre-call notification or other change signal, changes the contact's name information for the calling number to "verified call" or other similar alternative, and stores the purpose of the call in the contact information associated with the calling number. Some alternatives to the "verified call" language may include language such as "certified call," or other language that would indicate to the user that the call has been verified and can be trusted.

In at least one example, the purpose of the call may be displayed prior to the call being received allowing a user to expect a call from the enterprise or store. When the call arrives at the user device, the user can be notified using "verified call" as the caller identification text or other alternative text or image that has been stored with the contact information. Some alternatives to the "verified call" language may include language such as "certified call," or other language that would indicate to the user that the call has been verified and can be trusted. Additional text indicating the purpose for the call or other information relevant to the call can be provided as well. At some pre-determined point after the call arrives at the user device, the contact's name stored on the user device can be changed back to "Unverified call" either after the call has been connected, after it has ended, or after it has been declined. Thus, the system or method allows users to recognize legitimate calls as verified and spoofed calls as unverified so that the user can make a more informed decision about whether to answer the call. Using a contact name stored on the user device to identify an incoming call is more secure than relying on caller ID to identify the call. This is because the user must grant permission before changes can be made to contact names stored on the user device, but no permission grant is required to change the caller id information transmitted to the user device with the call when a spoofed call is made.

Based on the challenges described, the present disclosure provides a system that enables trust in enterprise outbound calls to customers and improves the overall customer call answer rate. In one example, this improvement in the customer call answer rate can be achieved for enterprise calls by sending a notification or alert containing text regarding the purpose of the call to the customer prior to initiation of a call from the enterprise and notifying the customer at call arrival that it is a verified call. For spoofed calls to the customer, for which the caller is pretending to be the enterprise, the customer is warned that the call is an unverified call, allowing the customer to take appropriate action.

In at least one example, an enterprise application or app installed on the user's phone receives a list of phone numbers, in some examples a spoof prevention list or contact list, from which the enterprise is capable of initiating calls. Each phone number or contact in this list is added to the contacts of the user device and the contact name is set to "Unverified call" or other similar text, name, or image that would suggest to a user that the call is not coming from a known enterprise phone number. With the contact name in this state, when a call arrives, the calling number of the enterprise, which is now present in a contact list on the user device, is displayed as "Unverified call" on the customer's screen or caller id, prompting the customer to dismiss, ignore, or be skeptical when answering the call. This usually happens when an incoming caller is spoofing the caller identity of the enterprise.

In at least one example, when the enterprise intends to make a phone call to the customer, a pre-call notification or alert can be sent by the portal or a server to the user device. The pre-call notification or alert may indicate the purpose of the call and the name of the customer service representative who will be making the call. The pre-call notification or alert causes the user device to modify the contact name language and/or image associated with the calling number to indicate to the user that the call is legitimate. The changed language may also include the purpose of the call. Therefore, when the call arrives from the enterprise, "verified call from enterprise" and/or "purpose of the call" or similar verbiage can be presented to the customer, thus enhancing trust that the incoming call is likely a valid call. In addition to the text, or verbiage, a logo or an icon may be presented to further aid in establishing trust in the call.

A portal/server can receive the purpose or other verbiage regarding the call along with the called number information from a customer relationship management (CRM) program or other contact storage or management system prior to the enterprise making the call. In other examples, the purpose can also be directly sent, selected, assigned, or uploaded to the portal by a customer service representative. In some examples, an enterprise may have a predefined list of call purpose verbiage for a customer service representative to utilize.

In at least one embodiment, a call acquisition function (CAF) can be used to monitor all outgoing calls from the enterprise voice network. In some examples, the call acquisition function can be implemented in software capable of being executed by a computer or other computing device, which is configured within the call network to monitor one or more transmission services or methods such as cellular networks and voice over internet protocol (VoIP). The call acquisition function and subsequent pre-call notifications can be implemented in such a way that these communications occur outside the normal stream for a voice or data transmission. Out-of-band signaling can be utilized to accomplish the notification functions disclosed herein so that such signaling can be independent of the signaling path of the call.

When a call is placed by the customer service representative, the call acquisition function detects the call by matching the calling number to a spoof prevention list in real-time or near real-time operation. Upon detecting a calling number matching a number on the spoof prevention list, the call acquisition function can extract call-related information for the detected call and notify the portal. The portal can then determine if the called number matches one of the notifications received by the portal from the CRM system or customer service representative. The notification sent to the portal may include the calling number, the called number, the time of call, and/or other information about the call. If the call information is matched, then a pre-call notification may be sent to a user device to change the contact name and/or image associated with the calling number on the user device.

The call acquisition function may utilize many different features, programs, circuits, systems, or protocols to create a notification, and/or activate other features, programs, circuits, systems, or protocols. For example, the call acquisition function may have an Ethernet Interface Manager, a Transmission Control Protocol (TCP) Flow Manager, a Session Initiation Protocol (SIP) message decoder, a Spoof Prevention List (SPL), a SIP Modified Call State Machine, and/or a Portal Connection Manager.

An Ethernet Interface Manager can allow for the monitoring of communications through different style and/or protocol analysis. In at least one example, the monitoring may be done through passive means. For example, the call acquisition function can allow for call monitoring in a manner that does not prevent or change the transmission of a call. Communications links may be monitored for traffic between two or more points in a communication system and/or network. The TCP Flow Manager may collect packets and/or arrange packets based on other analysis, data, or information. For example, incoming TCP packets may be collected and/or arranged based on the ordered TCP flows before being processed. Management of the TCP flows can be performed through the discarding of TCP packets or packet sets that have missing or incomplete packets. In some examples, the TCP flow manager can detect and/or discard duplicate TCP packets. If the Session Initiation Protocol (SIP) payload can be determined, it may be extracted and/or forwarded for additional processing.

The SIP message decoder may decode SIP payload, extract, and/or save parameters of calls received and/or transmitted over a communications system or network. The SIP message decoder can utilize the SIP message header information, and in at least one example, can create data records that include calling phone number(s), called phone number(s), and/or call identifier(s). These data records can be compared to the spoof prevention list, or other information handled by the portal or server, to determine if further action needs to be taken. A spoof prevention list can be stored in memory or storage associated with the portal or server to allow for calling phone number(s) to be detected for analysis and/or notification purposes.

In some examples, the spoof prevention list is accessed and processed by the call acquisition function to monitor calls. The list may be updated from a configuration management system, by direct or central database of phone number(s) associated with a user, business, enterprise, client, or customer. The updated list may be pushed to user devices through the app or other communication protocols that allow for modifications to the contacts stored on a user device. In at least one example, a user will be required to give the app, or enterprise, permission to store, modify, and/or otherwise change, add, or delete contacts on the user device.

The system or method disclosed in this embodiment utilizes the ability of the user device to override any contact information provided by an incoming call or data transmission. For example, if a user has Contact A associated with an enterprise number stored as a contact in the user device, a spoofer who sends a caller ID having the enterprise number can still call the user and send spoofed caller ID information having the enterprise number, but the contact name associated with Contact A in the user device will override any name provided by the spoofer in the caller ID information. Thus, by utilizing an app on the user device to add a set of enterprise calling numbers and give each a contact name or title initially that indicates the caller is unverified, the user will be warned that a spoofed call is occurring.

SIP modified call state machine information may include a full call state machine, or portions of the state machine for triggering, detecting, and/or monitoring specific events. For example, a call-start, or call-end event based on originating calls that are on the spoof prevention list may allow for different actions to occur. Notifications may be created for detected, monitored, or triggered events and forwarded to the Portal Connection Manager. The Portal Connection Manager can dynamically create connections based on events, notifications, or detections from the SIP state machines. In at least one example, the Portal Connection Manager creates a connection between the call acquisition function and a portal for sending notifications or alerts to an end user or customer of an enterprise or business. Application program interface requests may be utilized to send or receive the notifications.

Upon receiving the notification or alert from the call acquisition function, the portal can trigger a pre-call notification to a user device. The pre-call notification or alert can contain verbiage indicating the purpose of the call along with the name and calling number of the customer service representative. The pre-call notification or alert may dynamically modify the contact name associated with the calling number to language such as "Verified call from Enterprise," and/or "Purpose of the call," or other similar text indicating a verified or certified call is incoming from an enterprise in real-time or near real-time on the user device. When the user's device receives the call, the phone will then display "Verified call from Enterprise," or other language as desired. At some point after the call is received at the user device, the contact's name on the user device can be changed back to the original "Unverified call" language associated with the calling number. Thus, if the user receives a spoofed call later, the caller will be identified as an "Unverified call" to alert the user that the call has not been verified.

There are several ways that the contact's name on the user device can be changed back to the original "Unverified call" language. For example, a timer-based mechanism can be executed from or within the app, software, or by the user device. Alternatively, upon notification that a call has been ended or completed, or after a certain time period has elapsed, the portal can send a request to the user device to change the contact's name back to "Unverified call" and/or remove the purpose message or verbiage stored with or in the contact on the user device, or otherwise associated with the user device.

In another embodiment, an enterprise application, app, or computer-executed program may be installed on a computing device of a remote worker from the enterprise or store. The enterprise app can schedule a call directly with the customer or user, or in some examples, allow for a call to be made directly from the enterprise app to a customer or user. The remote worker may trigger a scheduling request along with the purpose of the call to the portal from the app installed on his mobile phone, mobile computing device, or computing device. In some examples, if the remote worker is calling from his private landline or private mobile device, the number may be temporarily added to a spoof prevention list for the enterprise or store that can be sent or synced with a customer or user device. The number may be removed from the spoof prevention list after the remote worker has completed a call or when requested by the remote worker.

In some embodiments, the portal/server can trigger an update to all registered users or customers who are utilizing the app whenever there is a need to update or sync the spoof prevention list. The update can be used to add and/or remove numbers from the list. The point of removal of a number from the spoof prevention list could be, for example, that the number has been deactivated, the number has been assigned to another department or division of the enterprise, or the enterprise received a completely new list of phone numbers after changing its carrier.

The syncing of the spoof prevention list may occur in real-time, near real-time, or at scheduled times. In some examples, it may be desirable to require a caller to wait until after the spoof prevention list is updated before making a call from a number not previously on the list. The portal may in turn notify the customer or user about the call scheduling request. The scheduled call information sent to or saved on the portal can trigger a pre-call notification or alert ("Purpose of the call" and/or "Name of the Customer representative will Call from Calling number") or similar information to a customer or user device, allowing for the pre-call notification or alert to be visible on the customer or user device for a predetermined duration prior to the scheduled call time.

In some examples, the pre-call notification or alert can dynamically modify a contact stored on the customer or user device with the calling number information and contact name information as "Unverified Call." For example, in the case of a remote worker, a number may be added to a contact list on the user device as part of the pre-call notification or alert, or through other means of updating the contact information. A separate call arrival notification can be triggered at or just before the scheduled time of the call from the portal, instructing or telling a user or customer device to dynamically modify the appropriate contact name associated with the calling number to language such as "Verified call from Enterprise" and/or "Purpose of the call." When the remote worker initiates the call, the customer receives it with a caller identification notification or indication such as "Verified call from Enterprise" and/or "Purpose of the call." The remote worker's contact information is maintained for a scheduled time, after which it may be deleted or modified by the user or customer device. This can be accomplished using a call ended notification or alert from the portal or timer expiry at the app, on the user device, or from the portal as discussed above. This is also the case when a call is being placed by the enterprise to the customer with the app. A pre-call notification is sent from the enterprise such as "Verified call from enterprise" that shall dynamically modify the contact list replacing the information associated with that calling number from "Unverified" to "verified call from enterprise". The contact information is maintained for a scheduled time, after which it may be deleted or modified by the user or customer device. This can be accomplished using a call ended notification or alert from the portal or timer expiry at the app, on the user device, or from the portal.

When a worker (customer service representative or other similar titled employee or individual) at the enterprise voice network wants to place an outgoing phone call to a customer or user mobile device with the enterprise app installed, the portal is populated with a purpose for the call that is either pushed or pulled from the enterprise's customer relationship management (CRM) system. Alternatively, the customer service representative from the enterprise voice network can directly enter the purpose of the call in the portal. When the customer service representative initiates the outgoing call to the customer phone, the passive monitoring element call acquisition function that monitors all the outgoing calls from the enterprise's voice network initiates a notification to the portal that an outgoing call is placed to a customer. The portal in turn initiates a pre-call notification to the customer or user mobile device about the arriving call from the enterprise. The pre-call notification can have information about the purpose of the call and the calling number of the call from which the call has been initiated.

The pre-call notification may also serve as a request to change the verbiage of the contact name that was downloaded from the spoof prevention list during the app registration or installation process. Upon reception of the pre-call notification or alert, the app in real-time or near real-time alters the verbiage to reflect "Verified call from Enterprise" or alternative language or image that indicates that the caller is an authorized or verified caller for the Automatic Number Identification (ANI) information present in the notification.

As the phone call arrives at the user or customer device, the app displays the "Verified call from Enterprise" text or similar language that reflects that the caller is certified or verified. The app on the customer or user device may send a security alert or notification to the portal when the call has been terminated or a predetermined time period has passed since the phone call was received. For example, a security notification or alert can be sent from the portal a few seconds after the call termination or after a predetermined time period to cause the verbiage of the contact name to be changed back to "Unverified Call" or similar language that would allow the customer or user to know that any subsequent call has not been verified. The window to receive legitimate call is open for only a pre-determined amount of time is to protect the end customer from being spoofed.

A scammer attempting to spoof the enterprise or store phone number may not have the ability to cause the customer or user device to change the verbiage of the calling number from "Unverified Call" to "Verified call from Enterprise" as the stored contact information associated with the number on the user device will override the caller ID information sent by the scammer. The customer device may present the spoofed call as an unverified call giving the customer or user the choice to ignore, answer, or otherwise handle the incoming call as they please.

Certain language has been illustrated herein that could be used, for example, to identify that a call has been verified, that it has not been verified, or that the call has a particular purpose. The language used herein such as "Verified call from Enterprise," "Unverified Call," "Purpose of Call," etc. can be customized or modified as desired. For example, the language "Verified call from ABC Company" could be used in the place of "Verified call from Enterprise" to indicate that the call is verified, and likewise, language such as "Update on your Order" could be substituted for the "Purpose of Call" language indicated above depending on the actual purpose of the call. It is expected that the nomenclature will be modified as needed to fit the situation with the goal of giving the customer the information needed to enable trust in a verified call and thereby allow the customer to make a more informed decision about whether to answer the call.

FIG. 1 is a flowchart of a method for caller identity verification in accordance with an embodiment of the disclosure. The method for caller identity verification may utilize the contact directory extensions along with an application or program executed from a computer readable medium on a customer or user device such as, but not limited to, a mobile computing device. The contact directory extensions may be a list of contacts or a list of contacts combined with other information or metadata to allow for identification or association of contacts with specific applications, users, devices, or other identifying information, that are not otherwise stored in the contacts associated with the user device. The contact directory extensions may be stored in storage on the user or customer device. Such information need not be stored in the user's normal contact directory. The call directory extensions may also be utilized along with the contacts stored or associated with the user device to allow for verified and unverified callers to be identified.

In at least one embodiment, the app on the user device can access the call directory extension of the user device to save a spoof prevention list. In the unlikely event that a number on the spoof prevention list is already stored in the user's contacts, it may be desirable to delete that contact information from the user's contacts prior to storage of the list. A user device may, when receiving a call, utilize the contacts on the user device first, and if not found, then the user device may check the call directory extensions next, and finally, if no contact information is found for the calling number, then and only then would the contact information provided by the network regarding the calling number be displayed.

An enterprise, store, or other business may utilize a portal to provide a list of calling numbers from the enterprise, store, or other business. In at least one example, the portal can also include a list of notifications, or allow for an employee of the enterprise, store or other business to create his or her own notification to notify the user or customer of the reason or purpose for the call prior to it being made. The portal may be configured with a set of default verbiage options. For example, a bank can configure one of the pre-configured notifications as "Account Clarifications." In at least one embodiment, the portal may also be connected to a Customer Relationship Management (CRM) system, such as but not limited to Salesforce™ or Hub Spot™, that allows employees, such as customer service representatives (CSR) to upload the purpose of the call prior to making a call to a customer or user based on notes or other documentation saved to one or more of the systems in step 101. The portal may be configured to pull information from the customer relationship management system, or from other enterprise systems.

With the portal acquiring the purpose of the call prior to the call being placed to the customer user, it can allow for notifications or additional information about the user or customer to be reviewed by the employee. The additional information about a user or customer may include notes, billing information, additional contacts, contracts, or other customer or user information stored in other enterprise storage systems or CRM systems that may be pertinent to the purpose selected. For example, if a user has requested a call regarding a loan balance, the portal may receive information from the CRM system regarding the balance of the loan and any special programs that may be available to address any issues for the particular loan type. The loan balance may be included as part of the notification to the user device, and/or to a customer service representative along with the latest statement or a link to the latest statement. If a custom purpose is utilized, it may be populated from the CRM system which in turn can push it to the portal or allow for it to be pulled from the CRM by the portal. The linking with the CRM system can allow for additional customer or user engagement through notes, billing information, additional contacts, contracts, or other customer or user information stored as part of the CRM system or other enterprise system and can be provided to the customer service representative prior to, or during, the call as needed.

Once collected by the portal, the custom purpose may be associated with a particular customer. This association may be included as part of the customer service representative engagement with the CRM system or be performed by the portal when the called or to be called number is identified as a registered user device with the enterprise. Alternatively, the customer service representative can enter the custom purpose directly into the portal, and associate it with a registered user, prior to the call being placed. This completes the process of collecting the purpose for the call and/or providing information that may be utilized for a notification or alert before, near, or at the time a call is made to the customer or user device from the customer service representative. It would be understood that the portal or CRM system(s) may be software executed from a computer-readable medium or media on a computing device or mobile computing device.

In step 102, a call acquisition function (CAF) or other monitoring system can monitor outgoing calls from a customer service representative or voice network. The call acquisition function can generate a notification or alert to the portal telling when a call has been initiated to a number on the spoof prevention list. The notification can include information about the calling number and/or a called number. The portal can then perform an analysis upon receiving the notification from the call acquisition function or other monitoring system. When the calling phone number is matched during the analysis with a scheduled call uploaded at step 101, then a pre-call notification can be sent to the registered user device from the portal at step 103. The call acquisition function may be software, or a program executed on a server or virtual machine (VM) in a private and/or public cloud computer architecture design. In at least one embodiment, the call acquisition function can passively monitor outgoing call (SIP/SS7/SIGTRAN or other communication protocol) traffic in real-time or near real-time across the voice network or enterprise network.

In some examples, the call acquisition function may be downloaded or be installed with a list of phone numbers for a voice network or set of customer service representatives. In at least one example, the list of phone numbers may be a spoof prevention list, approved list, or verified list of the enterprise, store, or other business phone numbers. In other examples, the call acquisition function can generate a call record for each call occurring from the voice network or enterprise and provide that call record to the portal.

If the call acquisition function is utilized to perform any analysis of the calling or called phone numbers, a call record can be generated when the calling number matches with a phone number on the stored enterprise spoof prevention list. In at least one embodiment, the call record in real-time or near real-time may become the trigger for initiating a notification or alert to the portal that an outbound call is being made to a customer or user. The call acquisition function can be utilized with the portal as a software as a service, subscription, API, or called set of functions that may be operated on computing devices or servers at an enterprise or business location, or at an operator facility or location.

The notification or alert may contain data or information such as, but not limited to calling number, called number and/or timestamp. The call acquisition function can execute this process of monitoring thousands of calls in real-time or near real-time simultaneously, using multi-threaded processes, allowing the call acquisition function to perform filter functions that may generate the notifications or alerts to the portal. The call acquisition function may include specialized network processors to filter out unnecessary traffic and/or allow the capture of only session initiation protocol (SIP) traffic or other network traffic utilizing specific communication protocols. Similarly, the call acquisition function may also be utilized as a distributed function where it can be deployed both in the cloud and/or across different physical locations. The call acquisition function can receive a packet stream either from a network packet broker or a virtual packet broker. The call acquisition function may be utilized in a packet-based communication system. While discussed as a call acquisition function, other monitoring systems may be utilized, including, but not limited to, application program interfaces (API) to network equipment or services directly in the call network path. For example, an API based solution can be utilized in non-packet networks to allow the CRM to directly trigger a message indicating call initiation to the portal, or alternatively, the customer representative could trigger the call initiation notification directly from the portal.

In step 103, after receiving the notification or alert that a call has been initiated, the portal can initiate and/or send a pre-call notification or alert to a customer or user device. In at least one embodiment, the customer or user device can be a mobile computing device or a mobile phone capable of receiving text, short messaging services, or data. The portal can implement server or server-like functionality that may allow it to maintain a connection with a plurality of call acquisition functions that are physically distributed across various locations in the world. In at least one example, the portal may be implemented on a server or other computing device.

While illustrated as a pre-call notification, other methods of communication such as email, text, short messaging services, chat features, or other communication methods may also be utilized with this system. The disclosed methods can be utilized with multiple communication protocols to allow an enterprise to alert a user or customer that one of its representatives will be contacting the user through a specified communication means, and that it is a certified or verified communication. For an email-based system, for example, a separate email recipient associated with the verification system could be added to an important email by the sender such that when the email is sent, a portal or server receives the email with identifying information. The portal or server can then send an email initiation notification to the recipient's device triggering a notification on the recipient's device that the email has been verified.

In at least one embodiment, when a notification or alert (calling number, called number, Timestamp) from the call acquisition function is received at the portal, the portal can match the called number with the phone number associated with a customer, or user device. The portal may trigger a pre-call notification or alert with a custom purpose or other language or verbiage provided as a default purpose configured by the enterprise. One example of verbiage for the pre-call notification can be in the form "Call will be received from Enterprise calling number: ###-###-####"+"Purpose").

In at least one example, the portal may utilize a token that has been acquired from the customer or user device as a part of the registration, download, or installation process. A token is often used to create an identification or verification that can then be utilized rather than any data or information that can be linked to a user or individual. In the example of a phone or communication system, the token may identify the device or communication link without providing any identifying information. The token may be utilized by the enterprise, store, or business to identify the customer or user, or their specific devices, while in other examples the token may be part of an authentication or multi-factor authentication protocol or system. The pre-call notification can be sent using this token to a customer or user device capable of connecting to networks supporting APNS/GCM/FCM or other similar protocols that in turn forward the notification or alert the user or customer device and/or an application or app on said user or customer device. The pre-call notification may include a call arrival notification or contact identifying alert ("Verified call from Enterprise") that the user or customer device may utilize to modify the contact identification information. The pre-call notification may also include the logo of the enterprise that establishes trust in the arriving phone call resulting in higher call-answer rate.

In step 104, the customer device receives the pre-call notification and modifies the contact name to a name indicating the contact is verified and optionally including the purpose of the call. Step 104, in at least one embodiment, allows for the app or application executed or running on a user or customer device to display a pre-call notification or alert to a user or customer to give the customer a heads up that the call is coming. The app can be an application or software stored and/or executed from storage on the user or customer device. In at least one example, the application can be from Sevis, with availability from the Apple® App Store or Google® Play or other similar software stores or downloadable locations.

In other examples, the functionality of the app can be integrated into the app of the enterprise or store. In any of these versions, when the user or customer device receives a pre-call notification through a communication or packet enabled network, the user or computing device can forward the notification or alert to the app for further processing or executions. Upon reception of the pre-call notification, the app may execute or initiate programs or protocols that allow for the message to be displayed on the user or customer device, and/or include information about the impending arriving call from the enterprise or store contact or voice network. During the installation and/or registration process, the app may download an enterprise or store contact list with phone numbers that an enterprise contact can originate a call from. The enterprise or store contact list can be stored in the contact list of the user device, or in the app and/or contact directory extension of the user or customer device. It would be understood that contact directory extension may be associated with a particular device or type of device, but could include functionality such as calling number, name, and/or contact notes or details to be displayed regarding a communication to the user device even without any of the information being stored in the contact list of the user device.

In at least one example, the enterprise or store contact list contains two parameters—the business or store name, and phone number. Typically, an enterprise will have more than one number that can be saved, but all the contact name(s) for the phone numbers are initially stored with language such as "Unverified Call." When a pre-call notification or alert arrives from the portal, the app matches the calling number from the pre-call notification with the business or store contact list stored in the app, user device contact list, and/or contact directory extension and accordingly modifies the contact name from "Unverified call" to "Verified call from Enterprise" or other language as may be desired to let the user know that the call has been verified.

In step 105, an enterprise or store contact (in at least one example, an employee or contractor of the enterprise or store) may initiate an outbound call to a customer or user device. Upon call arrival via one or more communication networks, the enterprise or store contact is displayed as "Verified call" and/or "Purpose of the call" or similar language based on the information in the pre-call notification or alert to the app and/or user or customer device. It would be understood that the pre-call notification or alert may occur seconds, or minutes before a call occurs. However, in cases where it is desired to give the customer pre-notification, this time could be a specific number of minutes before the phone call is to occur to allow a user or customer time to see the notification or alert prior to the call. Additional information could be provided to the user such as banking information, statements, manuals, or other documents. For example, if a user has requested a call regarding a loan balance, the portal may receive information from the CRM system regarding the balance of the loan and any special programs that may be available to address any issues for the particular loan type. The loan balance may be included as part of the notification to the user device, and/or to a customer service representative along with the latest statement or a link to the latest statement.

Manipulation of the contact name based on the received pre-call notification may include changing the contact name, identification, identification tags, notes, details, or other information or data stored with the contacts on the user or customer device or otherwise associated with the user device. The pre-call notification can have information about the impending call arrival and/or verbiage to be displayed to the user as part of the contact information and/or purpose of the call when it arrives. When the call arrives, the user or customer device, or the application can match the calling number with a number stored as part of the enterprise or store contact list and accordingly display the information as modified or previously stored in connection with the pre-call notification or alert. When the call arrives, the app and/or customer or user device may also display a logo or other images associated with the business, enterprise, or store to improve the trust factor with the customer.

In step 106, a timer or timer operation controlled either by the portal on a business computer or server or by the app running on a user or customer device may cause a security notification or alert that the call has ended or will be ending. In this manner, the user or customer device can be prompted to change the contact name or identifying information back to "Unverified caller" or similar language for the phone number stored in the business, enterprise, or store contact list.

In an example of the portal, a timer or timer operation may be preset for a specified time based on either the pre-call notification or the notification from the call acquisition function. At the expiration of the timer or timer operation, a post-call notification or alert may be triggered and/or sent to the customer or user device, like the pre-call notification or alert was sent. The post-call notification or alert may cause the user or customer device, or application, to perform a modification of a contact stored within the user or customer device, the contact extension directory, or within the application. The modification may include modifying the contact name, identification, tags, details, notes, or other information. For example, the contact name may be changed from "Verified caller" to "Unverified caller," or similar language, with the information regarding the purpose of the call, if any, being removed or deleted.

In an example, where the timer or timer operation is performed by the app or a user or customer device, at the expiration of the timer or timer operation, a post-call operation or process may be triggered and/or executed. The post-call operation or process may cause the user or customer device, or application to perform a modification of a contact stored within the application contact extension directory of the user or customer device or the application. The modification may include modifying the contact name, identification, tags, details, notes, or other information. For example, the contact name may be changed from "Verified caller" to "Unverified caller," with the information regarding the purpose of the call, if any, being removed or deleted.

In at least one example, the timer or timer operation(s), allow for the verbiage and/or contact name associated with the call that has recently been received or completed to be changed back to its previous state to indicate that any later communications from that number are unverified. As discussed in relation with step 105, the call arrival information may be displayed as "Verified call from Enterprise." Once the message is displayed, the app or the portal can start an internal timer, or timer operation, and at the expiry of the timer, the contact name information can be altered from "Verified call from Enterprise" to "Unverified Call." The portal can also start a timer or timer operation the moment it has sent a pre-call notification or alert. Upon expiry of the timer at the portal, the portal can send an end call or post-call notification or alert to change the verbiage of the contact name at the app or user or customer device from "Verified call from Enterprise" to "Unverified Call," or similar language. The purpose of this step is to change the verbiage at or near the time of the call to avoid spoofed calls from being labeled as verified calls. After the verbiage has been altered to "Unverified Calls," and assuming no pre-call notification is received from the portal, any call that is trying to spoof any of the enterprise contact list numbers at the user or customer device would result in "Unverified call" being displayed. It would be understood that the post-call notification, in at least one embodiment, may be sent before or after the call has been terminated or ended by the enterprise or store contact, or the user or customer.

Figure 2:
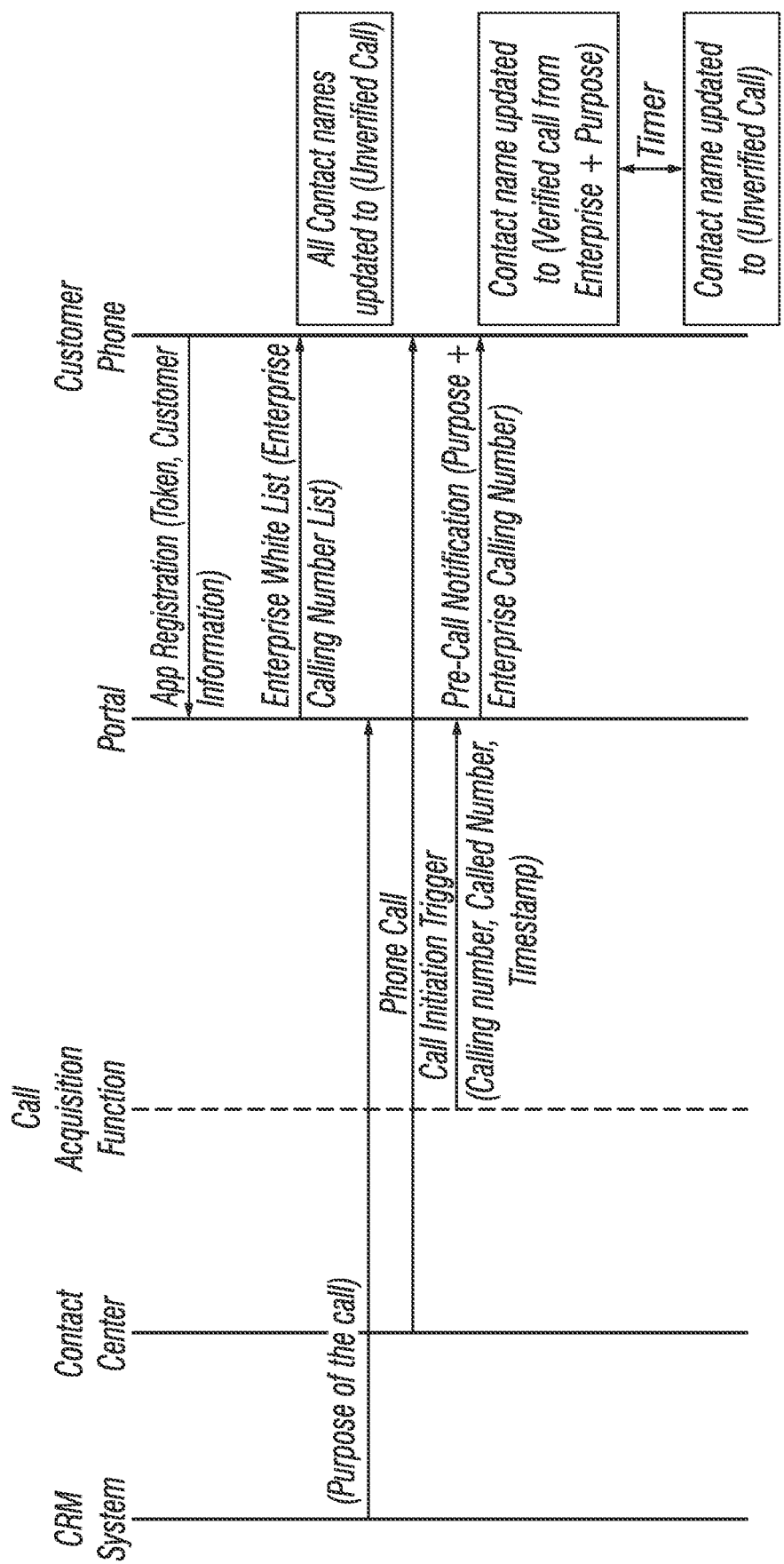
FIG. 2 is a transaction flow diagram for the method described with reference to FIG. 1 in accordance with an embodiment of the disclosure.

FIG. 2 is a transaction flow diagram for the method described above with reference to FIG. 1 in accordance with an embodiment of the disclosure. In operation, the portal and/or computing device executing or running the portal receives the purpose of the call from the customer relationship management (CRM) system prior to the call being made along with the called number information of the call. The call purpose can be directly uploaded to the portal by the customer service representative or can be loaded into the CRM system.

For example, a customer may call regarding a product issue, prompting the creation of a ticket or case within the CRM system. The case is then assigned to a customer service representative to work the case from an enterprise voice network. The call acquisition function (CAF) can monitor the outgoing calls from the enterprise voice network, and if a calling phone number matches with a number on the enterprise contact list (customer service representative calling numbers), the CAF may send a notification in real-time or near real-time to the portal. In some examples, the call acquisition function may send a call record to the portal, which analyzes the call record for a match. The portal may then send a pre-call notification if there is a match of the calling number to a number included on the spoof prevention list. A pre-call notification may include information or data such as, but not limited to, "Purpose of the call" and/or "Name of the Customer rep calling from Calling number."

In this case, the purpose of the call, including pre-call notifications, can be pulled or pushed from the CRM system to the portal. The purpose can be included so that the customer knows to expect someone to call regarding an issue at the enterprise, which in some cases may have been initiated by the customer. The pre-call notification or alert can be triggered from the portal to the app or customer device when the portal receives the notification from the call acquisition function. This pre-call notification can cause dynamic modification of the appropriate contact name or information associated with the calling number to "Verified call from Enterprise"+"Purpose of the call" in real-time or near real-time on the user or customer device. It would be understood that the application on the user or customer device may execute or initiate the dynamic modification of the appropriate contact based on data or information received over one or more communication networks. A timer-based mechanism executed or running through the app, the customer device, or by a notification or alert from the portal, can trigger the modification or alteration of the verbiage in the contact name back to "Unverified call" during or after the call is completed to prevent spoofed calls from being labeled as verified.

In at least one example, the portal can send the pre-call notification based on a configured time interval, such as, but not limited to, one to five minutes prior to the scheduled call. Other time intervals can be used, however, depending on the application and needs of the system. The pre-call notification can include the purpose of the call, the enterprise employee name, and/or phone number that the customer would receive a call from and may include other relevant information like the department, etc., as desired. The pre-call notification may trigger a dynamic modification of a contact on the customer device based on the following information (ANI X, "Unverified call"). The Automatic Number Identification (ANI) information allows for the identification of a phone number that is calling to the receiving device, and the default contact name allows for efficient processing on the user device. By using both the ANI and the contact name or other information, a user device can quickly establish which contact to change using various forms of filtering or identification.

In some examples, the class or type of calling device may be included as part of the information, or other data exchanged between a user device and the portal or server, allowing the enterprise or entity to know if the user has an Android, Apple, or other device. By knowing the device type, the enterprise will also know that communication means are available to communicate with the user. This includes communication options such as short messaging services, video communications, or other communication types that are device specific (one example being Apple FaceTime®). For example, if a user has an Apple® device, then the enterprise may utilize FaceTime® or other features of Apple® devices to communicate with that particular user via video conferencing.

The portal sends a call arrival notification at the scheduled time of the call or upon a notification from the call acquisition function or other monitoring service, which alters the contact name associated with the customer rep's phone number in the app to ("ANI X, "Verified Call from Enterprise"). When the call is terminated or after the expiry of the timer, a security notification can be sent from the portal to the customer's phone which causes the alteration of the contact information about the customer service representative back to "Unverified call," or similar contact name.

Figure 3:
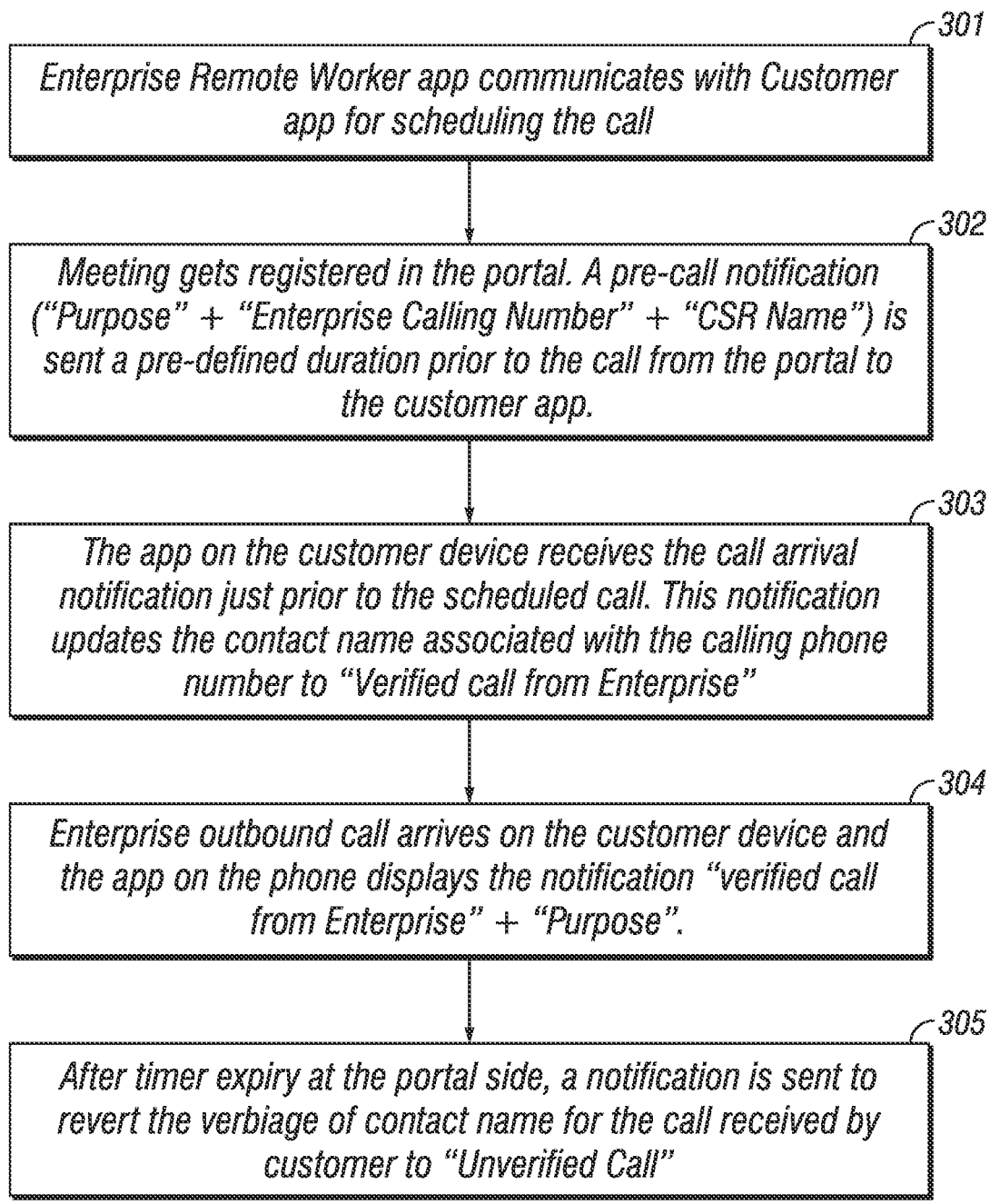
FIG. 3 is a flowchart of a method of caller identity verification in accordance with an embodiment of the disclosure.

FIG. 3 is a flowchart of a method of caller identity verification that includes a purpose of a call in accordance with an embodiment of the disclosure. The method of communication and/or operations can allow for a solution where an enterprise customer service representative is working remotely, such as during a pandemic or other work from home situations.

In step 301, a remote employee may utilize a personal or company device to communicate with a customer or user device through one or more communication networks and/or company-controlled devices or services for the purpose of scheduling a phone call with the customer or user. In the case of the remote worker, there may be no trigger of the pre-call notification from the call acquisition function as described in the previous flow as the call acquisition function may not be able to monitor employee personal devices or company devices located outside the enterprise's network. During the registration or installation of an app or application on the remote employee's device, the portal may upload, transmit, and/or download to the remote employee's device a list of customer contacts that the customer service representative can make. In some examples, the app may also include the ability for the remote employee to call from a number associated with the enterprise, store, or business.

In step 302, when a meeting, phone call, or other communication is scheduled between the user or customer and the remote employee, a pre-call or event notification or alert can be sent a pre-defined duration prior to the call from the portal to the user or customer device. In at least one embodiment, the pre-call notification or alert may include data, language, or notes that allow the user or customer device, or an application executed or running on the user or customer device, to display the purpose of the call, the enterprise or business making the call, and the customer service representative name. The pre-call notification may allow for additional operation or actions to occur at the portal or on the user or customer device. In at least one example, the app running on the remote employee's device may send a notification to the portal if a call is scheduled but the device is currently in use, allowing the portal to alert the customer that the customer representative may be delayed in calling.

After or during the scheduling of the call between the remote employee (customer service representative) and the customer, the scheduled call can be registered with the portal. Along with the registration, the remote employee can upload a purpose for the scheduled call and/or select from a predetermined set of call purposes. The call purpose may be directly sent or loaded into the portal or sent to the portal from a CRM system. Based on the information or data for the scheduled call, the portal may match the customer information and/or generate a pre-call notification ("Call will be received from Enterprise calling number" and/or "Purpose for the call") to the app on the customer or user device. In at least one example, the exchange of information between the portal and the customer or user device can utilize token information established and/or exchanged during the app registration or installation on the user or customer device. In at least one embodiment, the pre-call notification can be sent via communication networks utilizing APNS/GCM/FCM or other packet-based communications or carrier systems, a specified number of minutes prior to the scheduled call from the portal. In some embodiments, the specified time can range between one and sixty minutes. However, to be sure the customer is ready for the call but does not forget about the call, it may be desirable to select a time between one and five minutes for the pre-call notification. When a pre-call notification or alert ("Call will be received from Enterprise calling number"+"Purpose of call") or similar language arrives at the customer or user device, the app on the customer or user device may create or modify a contact name from "Unverified call" to "Enterprise calling number." Optionally, upon receiving the pre-call notification or alert, the user device may display an interactive message that allows the user to propose a different time for a call, request no call, or request alternative means of communication such as text, email, video chat, etc. These are some examples. There are any number of options that could be made available to the user to promote efficient communication between the enterprise and the customer. In the event one or more of these options is selected by the user, the user device can send a signal back to the portal, to the enterprise CRM system, or directly to the customer representative as may be desired. Upon receipt of the user's selected preference related to the proposed call, the proposed call or communication means can be modified as needed. In some examples, where the remote employee cannot use an enterprise, store, or business phone number, the remote employee's phone number can be added to the enterprise, or store contact list on the customer or user device, but the number may be prevented from showing or displaying for the privacy of the remote employee.

In step 303, a call arrival notification may be sent to the user or customer device triggering and/or causing the app or user device to modify the contact information for the calling phone number to include "Call from Enterprise calling number" and/or "Purpose" or similar language to alert or display to the user or customer that the call is a legitimate or verified call. In at least one example, the app on the user or customer device can modify the contact information on the user device, in the application, or the contact directory extension. Based on the notification, the app on the customer or user device matches the enterprise calling number or information and changes the contact name from "Unverified call" to "Verified call from Enterprise" in the storage location.

In step 304, the application may execute and/or cause the user or customer device to display "Call from Enterprise calling number" and/or "Purpose" stored with the contact information when the incoming call arrives at the user device from the remote employee's phone number. In at least one example, within a few seconds after the call arrival notification or alert from the portal, the actual call from the enterprise arrives on the customer or user device. The calling number upon call arrival can be matched with the app contact directory extension and it accordingly displays "Verified call from enterprise". The app on the customer or user device may also display a logo or other branding image at the time of the call arrival.

In step 305, the portal may initiate a timer or timer operation after the call arrival notification is sent to the user or customer device. At the expiration of the timer or timer operation, a security notification may be sent to the user or customer device to change the contact information for the phone number back to "Unverified Call" or other desired verbiage. In at least one embodiment, after the call arrival notification has been sent by the portal, the portal starts an internal timer to send the security notification. After the expiry of the timer at the portal, the portal sends the security notification or alert to prevent spoofed calls from being received as verified calls. Upon reception of the security notification or alert, the user or customer device may change the contact name or information associated with the enterprise calling number to "Unverified Call". This will enable scammer calls to the customer to be recognized as "Unverified call" when they try to spoof the enterprise calling numbers.

Figure 4:
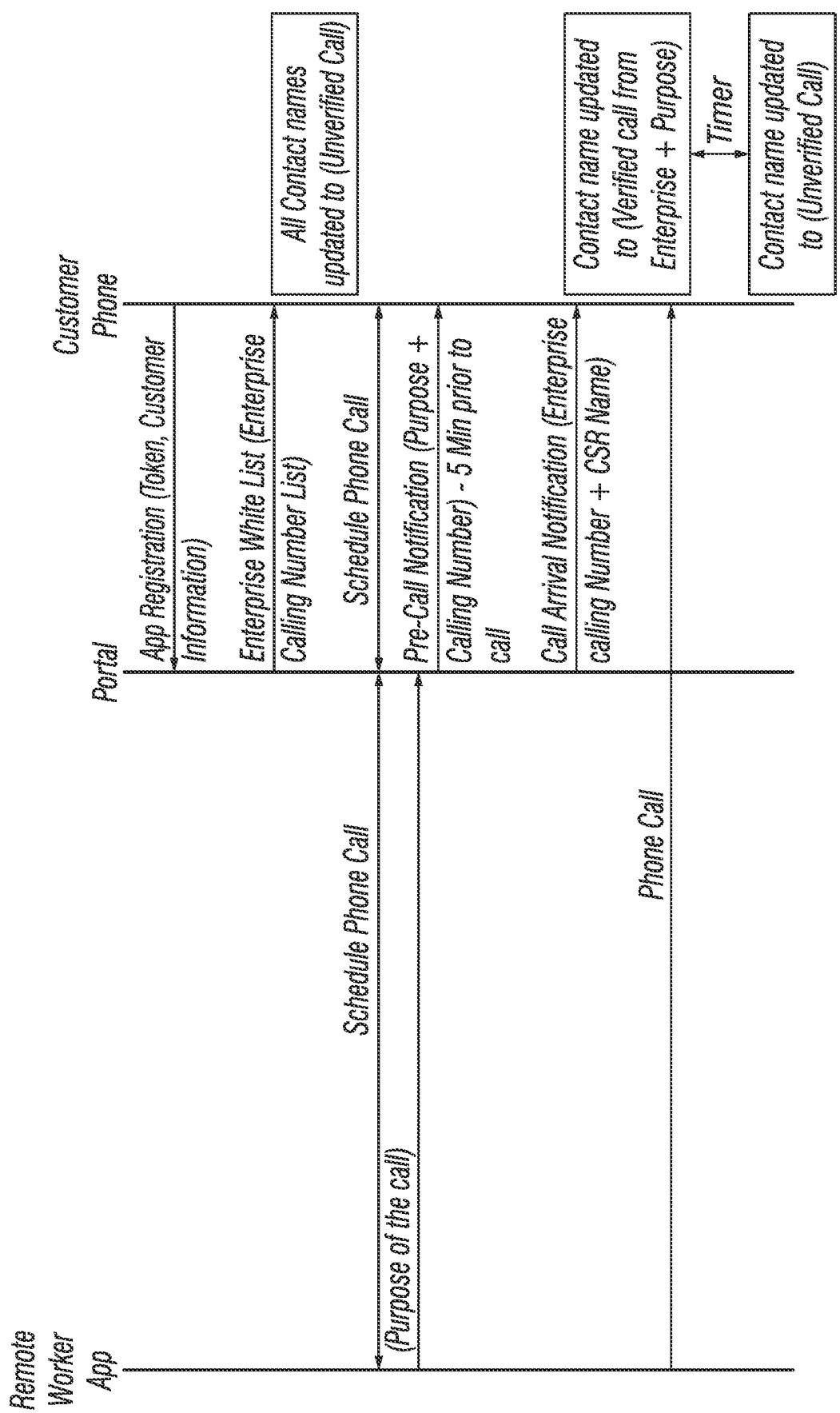
FIG. 4 is a transaction flow diagram for the method described with reference to FIG. 3 in accordance with an embodiment of the disclosure.

FIG. 4 is a transaction flow diagram for the method described with reference to FIG. 3 in accordance with an embodiment of the disclosure. In operation, the portal and/or computing device executing or running the portal receives the purpose of the call directly from a customer service representative or the call purpose can be loaded into the CRM system and then shared with the portal. For example, a customer may be called with an issue regarding a product, which in turn creates a ticket or case within the CRM system that is assigned to a customer service representative who then acts on the case from an enterprise voice network. In some examples, the portal may send a notice that a call has been scheduled to a remote employee of the enterprise. If the customer service representative is a remote worker, an enterprise app can be installed on a customer service representative's device. The enterprise app may be capable of scheduling a call directly with the customer, registering the scheduled call information with the portal, and/or allowing the customer rep to upload a purpose for the scheduled call. This enterprise app can also maintain a secure connection with the portal to communicate the scheduled call information with the customer.

In some examples, the call acquisition function (CAF) can monitor the outgoing calls from the enterprise voice network, and if a calling phone number matches with a phone number on the spoof prevention list (customer service representative calling numbers) it may send a pre-call notification in real-time or near real-time to the portal. However, because a remote worker may be calling from a personal or enterprise device outside of the network or firewall of the voice network, the call acquisition function may not be able to detect the call. In these examples, the enterprise app utilized by the remote worker may send a notification to the portal when a call is about to occur. The portal can then send a pre-call notification to the user device. The pre-call notification may include information or data such as, but not limited to, "Purpose of the call" and/or "Name of the Customer rep calling from calling number." The pre-call notification or alert can be triggered from the portal to the app or customer device when the portal receives the notification from the call acquisition function or enterprise app. This pre-call notification can cause dynamic modification of the appropriate contact name associated with the calling number to "Verified call from Enterprise" and/or "Purpose of the call" in real-time or near real-time on the user or customer device. It would be understood that the application on the user or customer device may execute or initiate the dynamic modification of the appropriate contact based on data or information received over one or more communication networks. A timer-based mechanism executed or running through the app and/or the customer device or by a notification or alert from the portal, can trigger the alteration of the verbiage in the contact name to "Unverified call" to prevent spoofed calls from being answered by the customer.

The portal in turn sends a pre-call notification a specified time, for example between one and five minutes, prior to the scheduled call with the purpose, the name of the customer service representative and/or phone number that the customer will be receiving the call from. In the event that the phone number of the customer service representative is not previously stored in the user's phone, the number can be added and stored as an "Unverified Call" similar to the way the enterprise phone numbers are stored. This can be accomplished during a normal sync or update of the spoof prevention list with the user's phone. The portal sends a call arrival notification at the scheduled time of the call which alters the contact name associated with the customer representative's phone number in the app or on the user device to ("ANI X, "Verified Call from Enterprise"). When the call is terminated or after the expiry of the timer, a security notification can be sent from the portal to the customer's phone or device that alters or deletes the contact information about the customer service representative. A deletion generally will only occur in this manner if the customer service representative is using a personal device.

Figure 5:
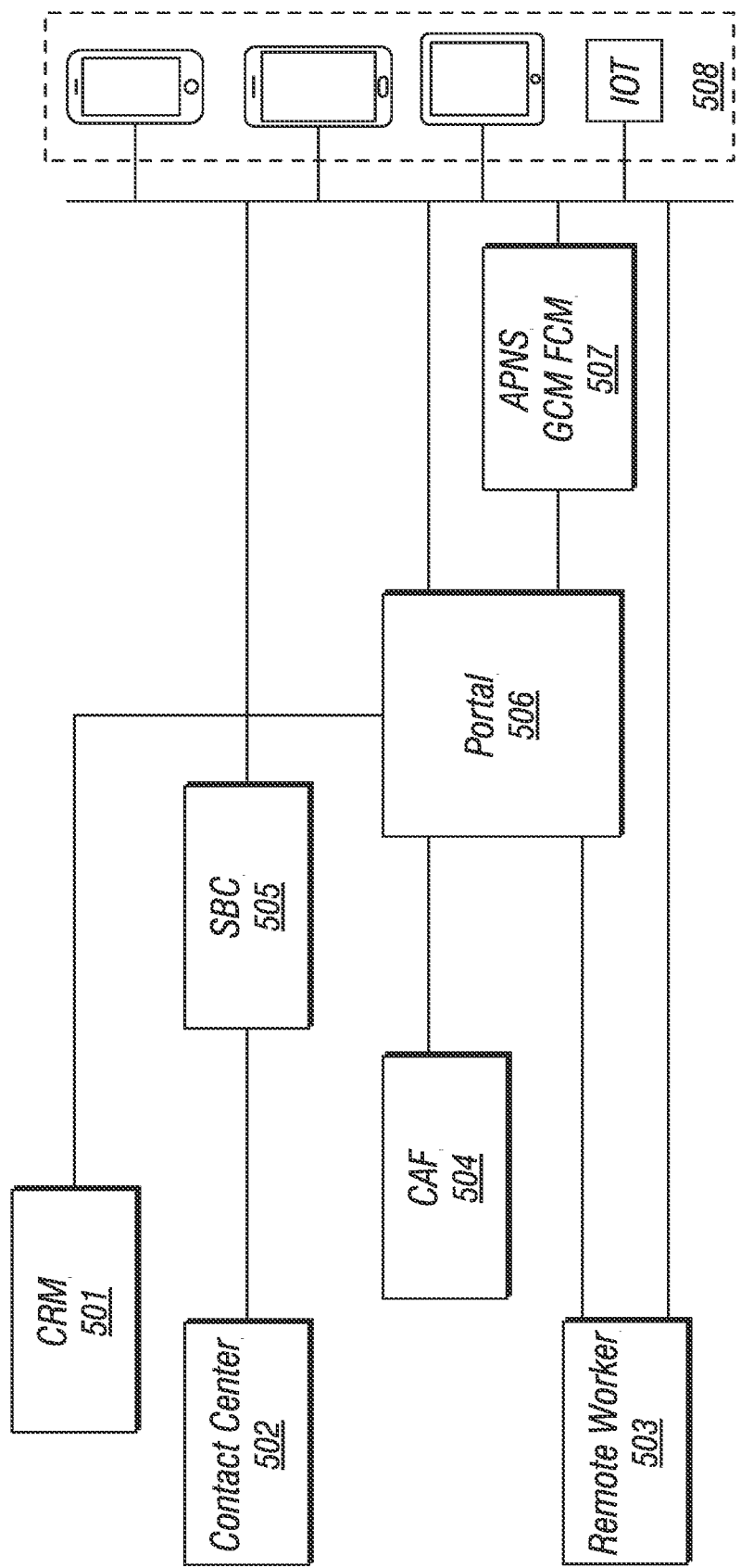
FIG. 5 is a block diagram of a solution architecture environment for caller ID verification using a mobile device in accordance with an embodiment of the disclosure.

FIG. 5 is a block diagram of a solution architecture environment for caller ID verification using a mobile device in accordance with an embodiment of the disclosure. The enterprise components of the system 501, 502, 504, 505, 506 can be placed behind an enterprise network firewall in a compact or distributed system. For example, in a distributed system the components could be referenced as the enterprise or business cloud. The APNS/GCM/FCM network 507 can be referenced as the public cloud or a set of communication networks or systems, capable of connection to one or more of the different customer mobile devices 508. Remote worker 503 may be a customer service representative or other employee of the enterprise, store, or business that is working remotely or from a company mobile device.

The contact center 502 can be owned by a business, enterprise, or store that is responsible for making outbound calls to users or customers as a part of customer engagement or to conduct its business. Direct or indirect communication network connection(s) can allow for communication between the contact center 502 and the SBC (Session Border Controller) 505. In at least one example, the indirect communication network connection(s) may be illustrated as a distributed network connection that can act as one or more carriers for the SIP traffic associated with the calls between the enterprise contact center 502 and customer mobile devices 508.

The call acquisition function (CAF) 504 may be deployed as a server/VM in the private/public cloud. The call acquisition function 504 can be a distributed function and/or capable of being deployed across multiple locations to monitor the signaling traffic (SIP/SIGTRAN/SS7) in real-time or near real-time. In some examples, the call acquisition function 504 generates call records for phone calls detected from the contact center 502 and sends the call records to the portal 506 for analysis. In other examples, the call acquisition function 504 can be populated with an enterprise contact list that includes the phone numbers that can be utilized as calling numbers for outgoing calls from the enterprise contact center 502. The portal 506 may push updates of the enterprise contact list to an enterprise app on a remote worker's device, the call acquisition function 504 or user devices 508 when updates are made to the enterprise contact list. The call acquisition function 504 allows for monitoring of the outgoing calls from the enterprise that match the calling number information stored with the enterprise contact list to initiate notifications from and/or to the portal 506. The notification may contain information about the call.

Customer relationship management system 501 can collect the purpose of the call prior to the call being placed to the enterprise customer or user. In some examples, the customer relationship management system 501 can allow for enterprise employees to share notes, details, or contact information for enterprise customers or users. The purpose of the phone call can be populated in the customer relationship management system 501 by the remote employee 503. The purpose of the phone call can be shared with the portal 506 that may be integrated with the customer relationship management system 501 through a direct or indirect connection where the customer relationship management system 501 can push information about the purpose of the call along with the called number or other customer information to the portal 506. In other examples, the portal 506 can poll for call purpose updates for different customers and pull the information from the customer relationship management system 501. The purpose of a specific customer call can also be directly populated in the portal 506 by the remote employee 503. It would be understood that the remote employee 503 may also be an in-house enterprise employee working at a physical location of the enterprise or at the enterprise contact center 502.

The portal 506, implemented on a computing device or server, where the computing device or server can be utilized in the enterprise (e.g., a bank) network/cloud system, architecture or structure that may be capable of hosting and/or performing several functions. The portal 506 can be capable of implementing the function of handling the registration and/or installation process of the apps installed, downloaded, or synced on customer mobile devices 508. In some examples, these functions may be performed using secure communication to maintain privacy. In at least one example, a token can be exchanged between the customer mobile devices 508 and the portal 506, rather than any personal information. The portal 506, upon accepting the registration and/or installation, may upload or download the enterprise contact list with the contact names as "Unverified calls" for the entire contact list of enterprise calling phone numbers.

In at least one embodiment, this list can be referenced as a spoof prevention list. The other functions the portal 506 may implement can include the reception of information from the customer relationship management system 501 about the purpose of the call for a particular customer prior to the call being made. The portal 506 may also implement the function, process, or execution of a software program for generating a push notification upon reception of a notification from the call acquisition function 504 about an outgoing call initiated from the enterprise. The portal 506 can match the calling number included as a part of the notification from the call acquisition function 504 with the customer information on the portal 506 or customer relationship management system 501 and send a push notification to the user device 508 with the purpose of the communication populated from the customer relationship management system 501 or the remote employee 503. The pre-call notification in at least one example can be sent to the customer using the token collected as a part of the app registration and/or installation over APNS/GCM/FCM 507 communication networks or systems.

The user devices 508 may include any kind of mobile devices or computing devices configured to receive phone calls, video calls, text messages, or other forms of communication protocols independent of the OS on these devices. The phone calls may be connected through telephone exchanges or over internet protocol. Nonlimiting examples of user devices 508 include a smartphone, a tablet computer, and a laptop computer. The user devices 508 shown in FIG. 5 are merely illustrative and other user devices such as smartwatches and desktop computers are within the scope of this disclosure. A user device 508 can have an enterprise app integrated with the functionality or an app from Sevis to enable the solution described in this disclosure.

Figure 6:
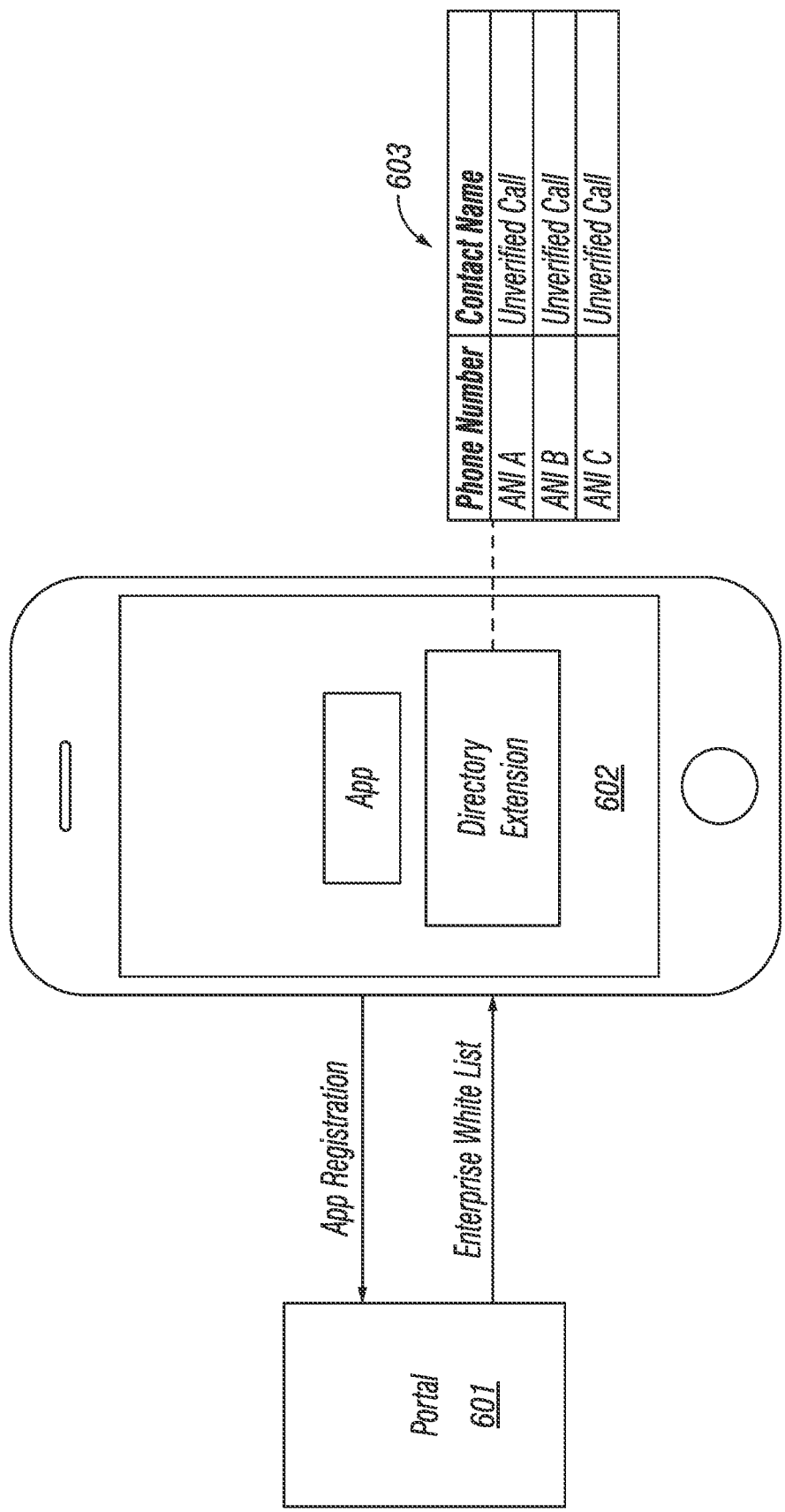
FIG. 6 is a block diagram showing the initial interactions between a portal and a customer device in accordance with an embodiment of the disclosure.

FIG. 6 is a block diagram showing the initial interactions between a portal and a customer device in accordance with an embodiment of the disclosure. The portal 601 may be a computing device or server, capable of communicating via one or more communication networks. The portal 601 may allow for communications and/or interactions via the one or more communication networks, such as but not limited to registration and/or installation of an application, app, or computing device executed software on a customer or user device 602. In at least one embodiment, an enterprise contact list may be transferred to the user or customer device 602 along with information regarding said contact list, such as but not limited contact numbers and/or contact names 603.

In at least one example, the customer or user may download the app from an Apple® app store, Google® play or similar digital or internet-based download location, and the user or customer may install the app on the device 602. The app can communicate over one or more communication networks configured to utilize APNS/GCM/FCM or similar packet-based communication protocols. In at least one example, to transmit and/or communicate over the one or more communication networks, a token can be established and/or allocated for communication between the app or user device 602 and the portal 601.

The app may utilize a URL stored in the app or on the user or customer device 602 to send the registration information (Name, Phone number, and Token) to the portal 601. The portal 601 upon receiving the registration request can create a profile for the customer or user that may be stored in storage coupled to or accessible by the portal 601. The portal 601 transmits the spoof prevention list that includes a list of phone numbers comprising calling numbers for the outgoing calls to the customers from the enterprise voice network. When the list is uploaded to the app or customer device 602, the app or customer device 602 can store the spoof prevention list in the device contacts or as part of the contact directory extension with the contact names listed initially as "Unverified calls" 603 or other similar language. In at least one example, contact directory extension creates these contacts and stores their names 603.

Figure 7:
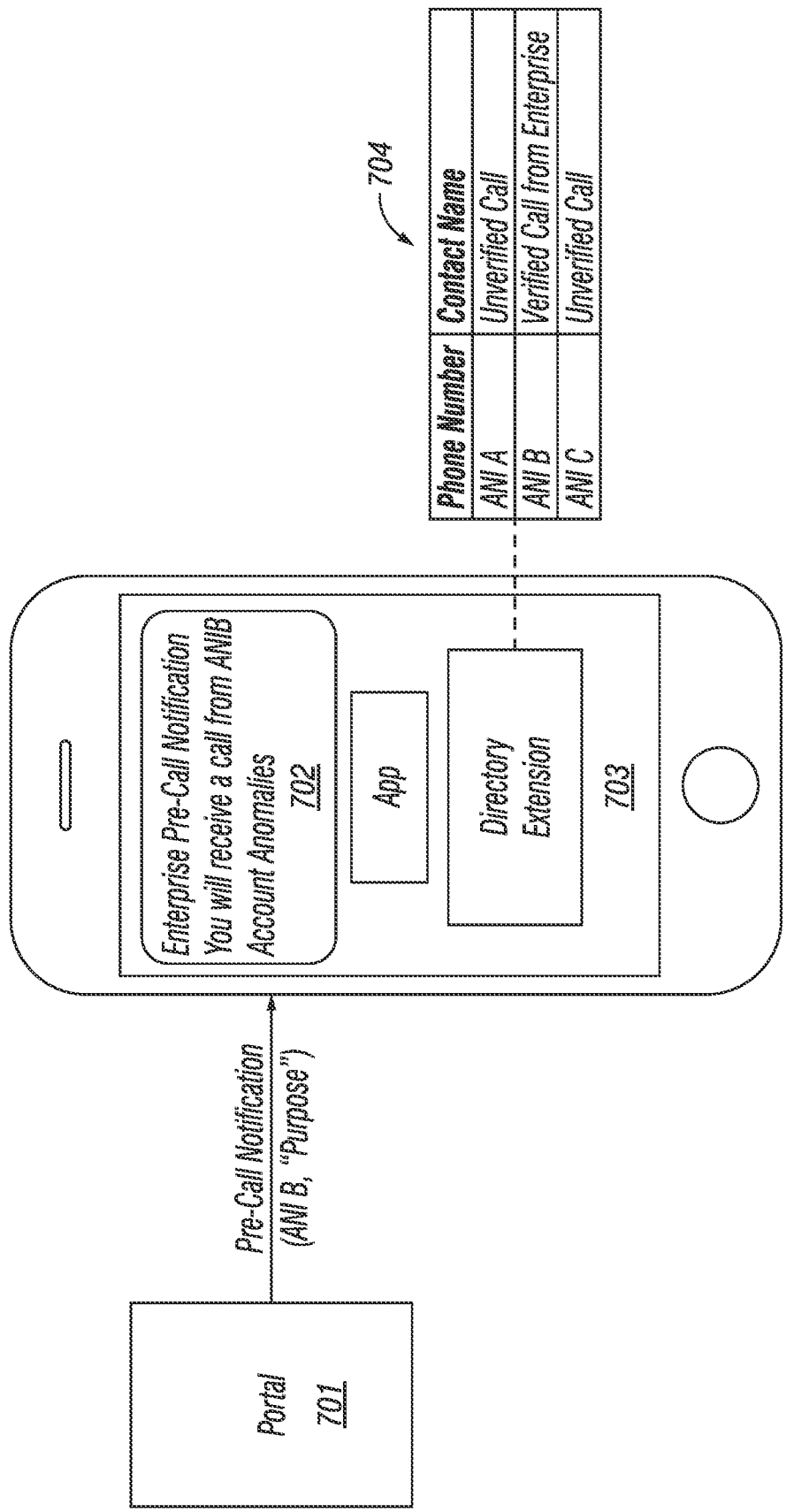
FIG. 7 is a block diagram showing a pre-call notification communication between a customer device and a portal in accordance with an embodiment of the disclosure.

FIG. 7 is a block diagram showing a pre-call notification communication between a customer device and a portal in accordance with an embodiment of the disclosure. In at least one embodiment, the portal 701 can trigger, transmit, or have a process for sending a pre-call notification to an app on a customer or user device. The pre-call notification may then cause other processing, or actions to be taken on the customer device 702. When the pre-call notification arrives at the customer device 702, the customer device 702 can display a notification or alert about the impending or upcoming enterprise call arrival as shown in FIG. 7. The pre-call notification may initiate a search in the contacts or contact directory extensions 703 based on the enterprise calling number listed in the notification. It would be understood that these actions may be modified for different versions of software, operating systems, or customer devices. The app or customer device implementation may deploy different search algorithms to execute the search efficiently to minimize the time to find an exact match. Once the appropriate contact (illustrated as ANI B) is found in the customer device contact list 704, the contact name in the contact or contact directory extensions 703 associated with the enterprise calling number is changed to "Verified call from Enterprise" from "Unverified call".

Figure 8:
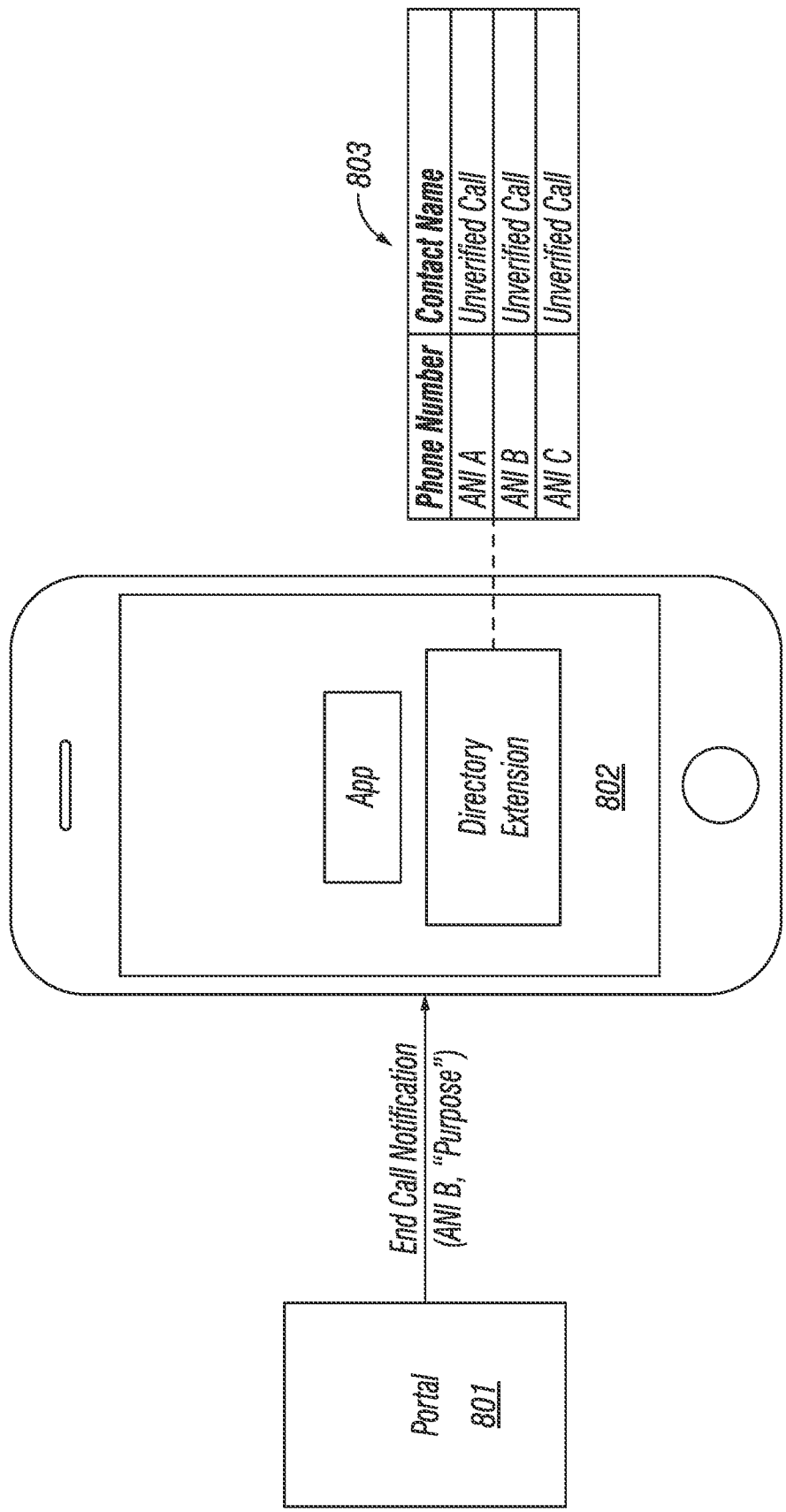
FIG. 8 is a block diagram showing an end-call notification communication between a portal and a customer device in accordance with an embodiment of the disclosure.

FIG. 8 is a block diagram showing an end-call notification communication between a portal and a customer device in accordance with an embodiment of the disclosure. In at least one embodiment, the portal 801 may trigger, transmit, or otherwise utilize processes for sending a security notification or alert to a user or customer device 802 or an application running on the customer device 802. After the pre-call notification (discussed in reference to FIG. 7) has been sent from the portal 801, an internal timer can be launched at the portal 801 to send a security notification. The timer or timer operation executed by the portal 801 can be configurable and applied to outgoing phone calls placed by an enterprise voice network for which a pre-call notification has been sent from the portal 801. Upon expiration of the timer or timer operation at the portal or computing device executing the portal 801, security notification or alert, directly or utilizing the token information from the customer profile on the portal (801) is sent to the customer device 802 to enable spoofing prevention. When the app running on the customer device 802 receives the security notification or alert, it can initiate a search in customer device 802 contacts or call directory extensions or similar contact storage as appropriate depending on the implementation. Once the appropriate contact (illustrated as ANI B) matching the enterprise calling number is found, the contact name is altered from "Verified call from enterprise" to "Unverified call" (803).

Figure 9:
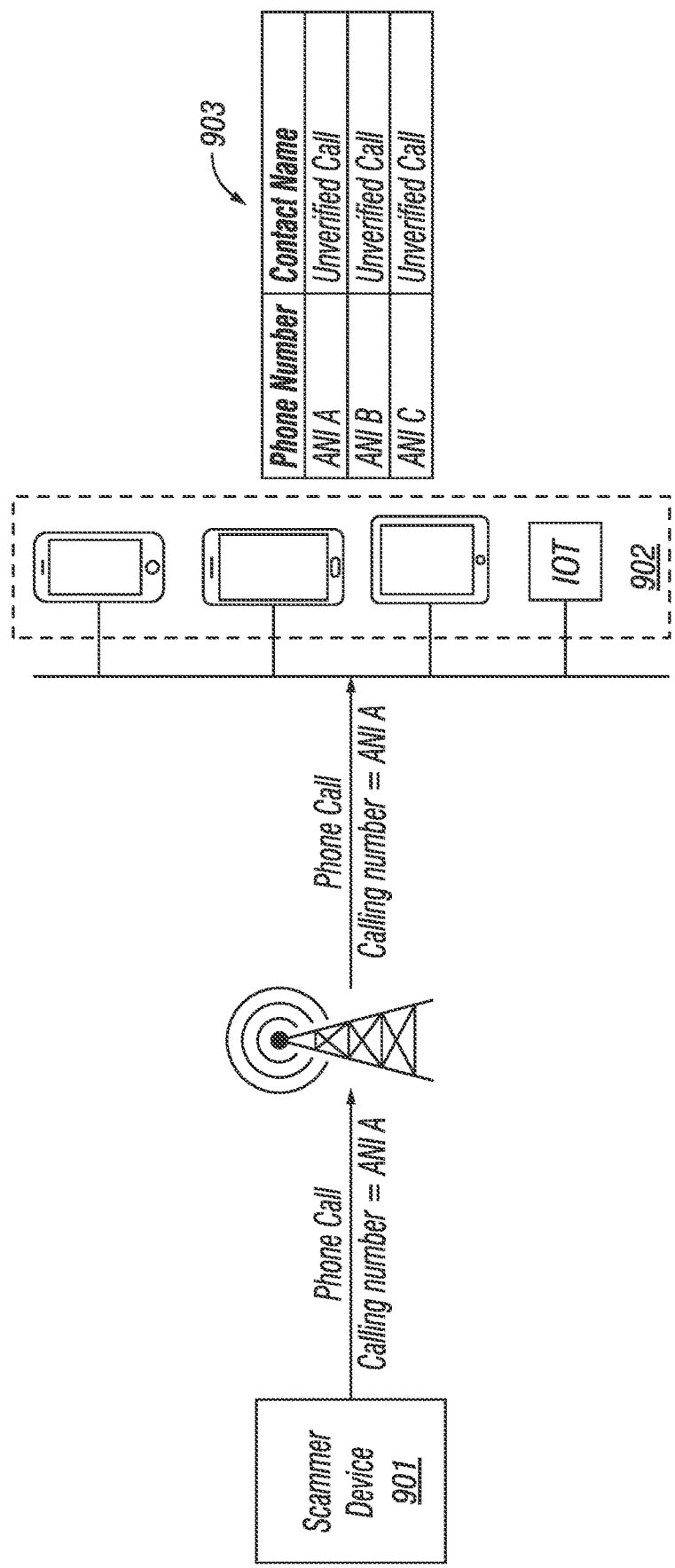
FIG. 9 is a block diagram showing a call from a scammer to a customer in accordance with an embodiment of the disclosure.

FIG. 9 is a block diagram showing a call from a scammer to a customer in accordance with an embodiment of the disclosure. In at least one example, the scammer device 901 may be any kind of communication device that scammer may use for phone number or caller identity spoofing. In some examples, the scammer device 901 may utilize multiple computing devices to spoof a phone number or caller identity (ID). The spoof prevention list (903) stored on the customer device 902 can be downloaded from the portal with all the contact names as "Unverified Call." When the scammer makes a call to an enterprise customer, the customer device 902 matches the incoming phone number with a number on the spoof prevention list as ANI X (could be any of ANI A, B or C illustrated or any number of ANI utilized by the enterprise). When a spoofed phone number matches a phone number stored in the spoof prevention list stored as a contact or part of the call directory extension, the user device will display "Unverified call." This warns the user of the spoofed call.

Figure 10:
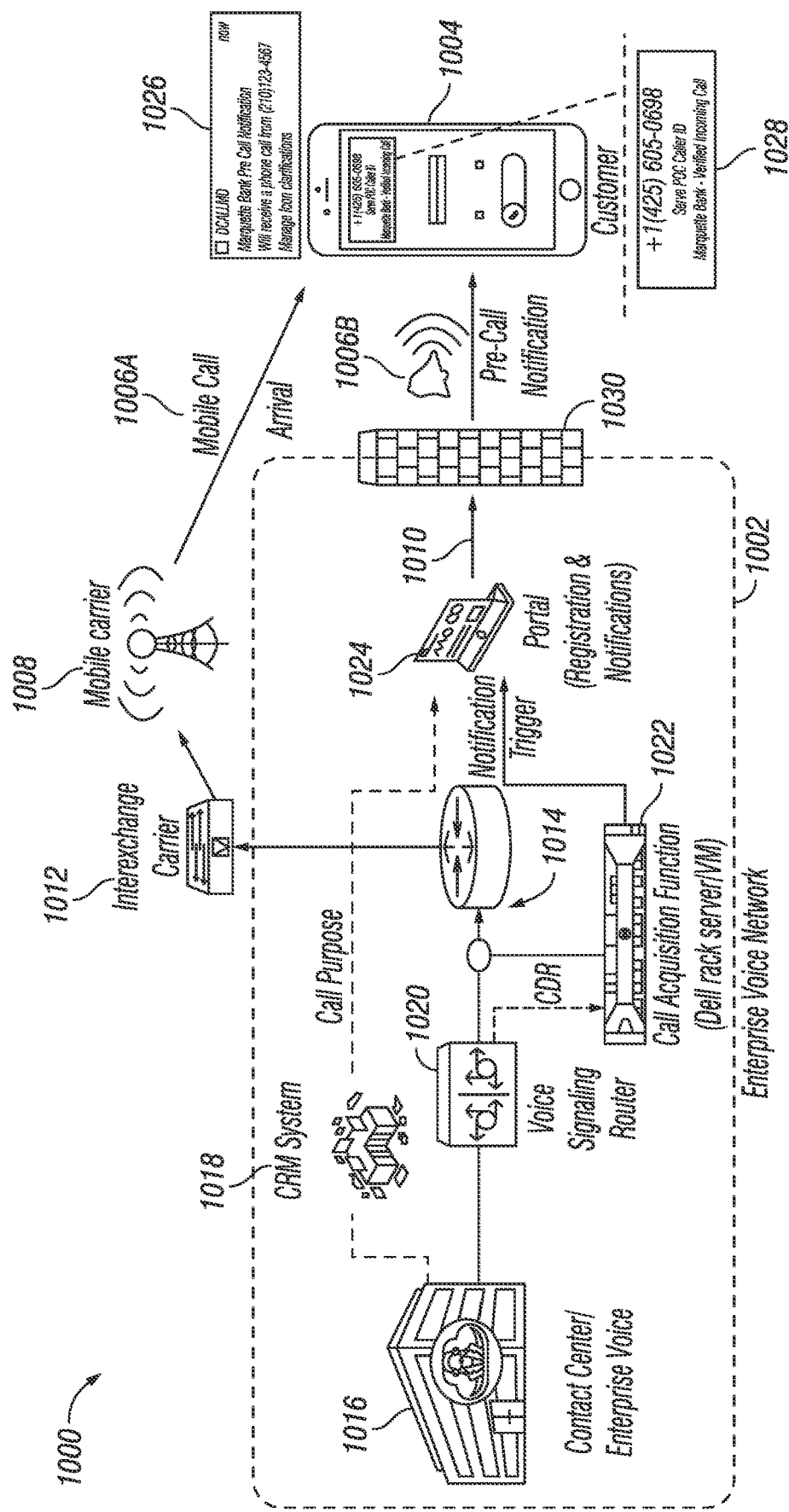
FIG. 10 is a network architecture diagram of a caller identity verification system in accordance with an embodiment of the disclosure.

FIG. 10 is a network architecture diagram of a caller identity verification system in accordance with an embodiment of the disclosure. The caller identity verification system 1000 can allow for an enterprise voice network 1002 to provide communications to a user device 1004 over a telecommunications system. The communications 1006A and/or 1006B may come through a mobile carrier 1008 or data communications systems 1010, such as but not limited to fiber, cable, DSL, or other wired or wireless connection.

In at least one example, the mobile carrier 1008 may communicate with interexchange carrier 1012. The interexchange carrier 1012 may be one or more communication systems, such as but not limited to, cellular telephone carriers, long-distance telephone companies or systems. In another example, the interexchange carrier 1012 may be referred to as an IXC. The interexchange carrier 1012 may allow for a signal to be transported locally or over a long distance based on one or more wired or wireless network protocols. The interexchange carrier 1012 can receive communications, and/or telephone communications from the enterprise voice network 1002. The enterprise voice network 1002 may have a router, private branch exchange (PBX), signal converter or conditioner and/or other device, system, or mechanism 1014 that can allow for the transition of internal voice communication to external protocols.

The enterprise voice network 1002 can include a contact center 1016 that may allow for voice and/or data communication to internal locations. In some examples, the contact center 1016 can be a voice transmission or signal origination point. An employee of the enterprise may interact with a CRM system 1018 that can trigger alerts and/or notifications about employee activities. The contact center 1016 and the CRM system 1018 may interact through data, or non-voice communication networks or protocols, in at least one example. Voice signals may be sent through a voice signaling router 1020 that can, in at least one embodiment, generate call detail records (CDR) and/or provide call information to a call acquisition function (CAF) 1022. In at least one embodiment, the call acquisition function 1022 can monitor direct phone calls as they are transmitted between the voice signaling router 1020 and the router, private branch exchange (PBX), signal converter or conditioner and/or other device, system or mechanism 1014. The monitoring can be enhanced by the receipt of the CDR data and/or information. In some examples, the call acquisition function 1022 may be able to monitor the transmitted phone calls to gather the information included in the CDR.

The call acquisition function 1022 can detect from the call information, the calling phone numbers, or other indicators from the CDR, when a phone call matches information shared and/or sent to the portal 1024 from the CRM system 1018. The portal 1024 can receive call information such as caller, called number (call receiver), a purpose for the call, the calling entity, and/or other information or data about or concerning the call. For example, the portal 1024 may receive a call purpose from the CRM system 1018 indicating that enterprise employee Y will be calling a user X at a specified time regarding user X's bank account with enterprise Y and user X's loan balances. The portal 1024 may send a pre-call notification or alert 1026 to the user device 1004 indicating the purpose, the enterprise, and/or the employee name prior to the phone call. When the outgoing phone call from the enterprise is detected by the call acquisition function 1022, a notification can be sent to the portal 1024, which in turn sends the pre-call notification or alert 1026 to the user device 1004 to change the caller ID information 1028 by way of the contact list or call directory extension on the user device 1004 from an unverified caller to verified caller from enterprise X as discussed above.

In at least one embodiment, the caller ID information and/or data for each outgoing phone number of the enterprise voice network 1002 may be stored on the device 1004 when an app or other contact information or data is integrated with, interacts with, or is otherwise stored or activated on the user device 1004. It would be understood that firewall(s) 1030 may be utilized to protect data, information, connection, and/or networks from intrusive attacks attempting to access user or enterprise data or information without authorization.

Figure 11:
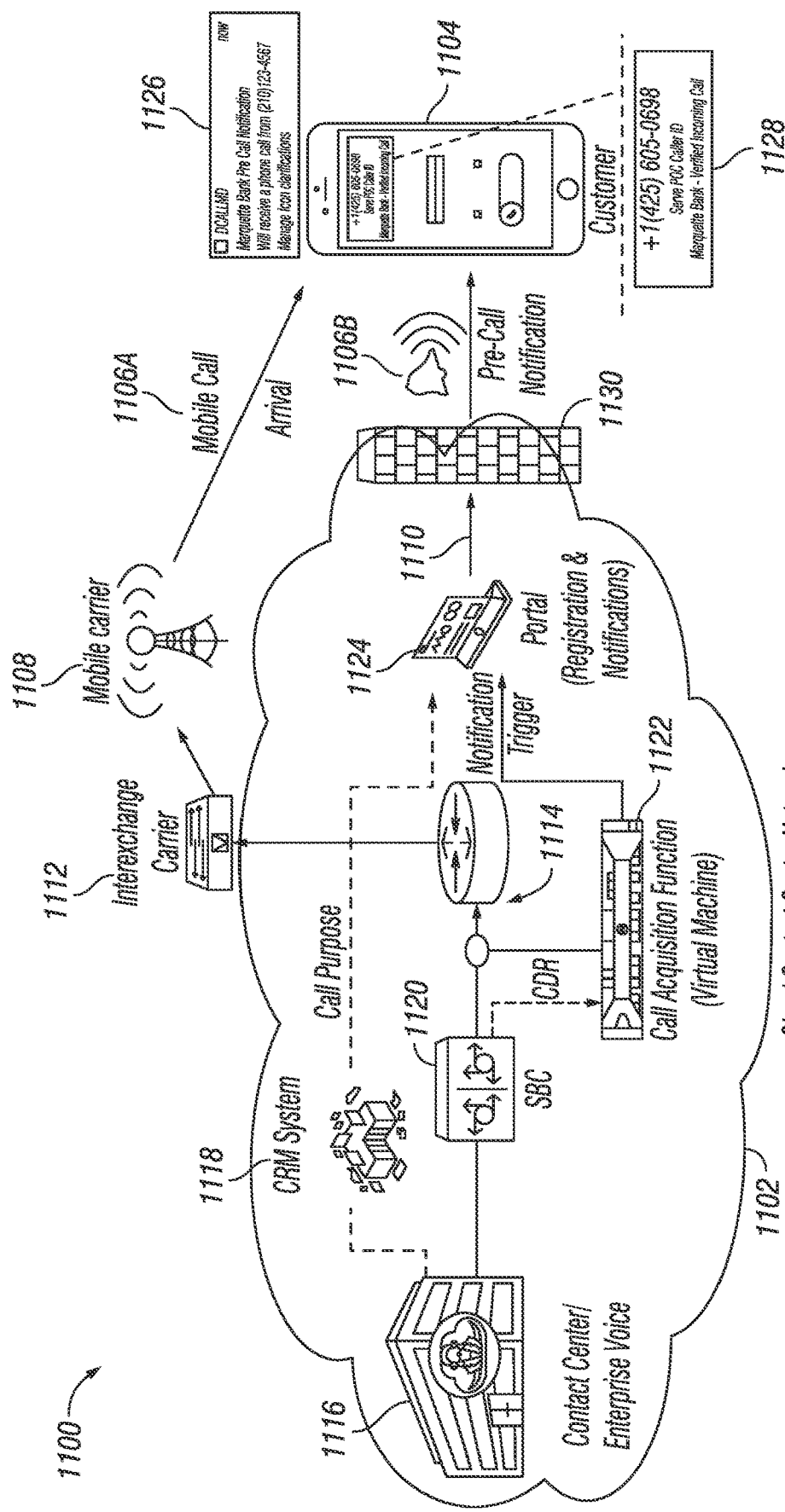
FIG. 11 is a network architecture diagram of a caller identity verification system in accordance with an embodiment of the disclosure.

FIG. 11 is a network architecture diagram of a caller identity verification system in accordance with an embodiment of the disclosure. The caller identity verification system 1100 can allow for a cloud contact center network 1102 to provide communications to a user device 1104. The communications 1106A and/or 1106B may come through a mobile carrier 1108 or data communications systems 1110, such as but not limited to fiber, cable, DSL, or other wired or wireless connection.

In at least one example, the mobile carrier 1108 may communicate with interexchange carrier 1112. The interexchange carrier 1112 may be one or more communication systems, such as but not limited to, cellular telephone carriers, long-distance telephone companies or systems, using either wired or wireless network protocols. In other examples, the interexchange carrier 1112 may be referred to as an IXC. The interexchange carrier 1112 may allow for a signal to be transported locally or over a long distance based on one or more wired or wireless network protocols. The interexchange carrier 1112 can receive communications, and/or telephone communications from the cloud contact center network 1102. The cloud contact center network 1102 may have a router, private branch exchange (PBX), a signal converter or conditioner, and/or other device, system, or mechanism 1114 that can allow for the transition of internal voice communication to external protocols.

The cloud contact center network 1102 can include a contact center 1116 that may allow for voice and/or data communication to internal or external locations. In some examples, the contact center 1116 can be a voice transmission or signal origination point. An employee of the enterprise may interact with a CRM system 1118 that can trigger alerts and/or notifications about employee activities to a portal 1124. The contact center 1116 and the CRM system 1118 may interact through data, or non-voice communication networks or protocols, in at least one example. Voice signals may be sent through a session border controller (SBC) 1120 that can, in at least one embodiment, generate call detail records (CDR) and/or provide call information to a call acquisition function (CAF) 1122 or other monitoring system. In at least one embodiment, the call acquisition function 1122 can monitor phone calls as they are transmitted between the session border controller (SBC) 1120 and the router, private branch exchange (PBX), a signal converter or conditioner and/or other device, system or mechanism 1114 in a manner that does not interfere with the call or require equipment to be in the signal path. The monitoring can be enhanced by the receipt of the call data records (CDR) and/or information. In some examples, the call acquisition function 1122 may be able to monitor the transmitted phone calls to gather the information included in the CDR.

The call acquisition function 1122 can detect from the call information, the calling phone numbers, or other indicators from the CDR when a phone call matches information stored in and/or sent to the portal 1124 from the CRM system 1118, and the portal 1124 can then send a notification to a user device 1104. The portal 1124 can receive call information such as caller, call destination (call receiver), a purpose for the call, the calling entity, and/or other information or data about or concerning the call. For example, the portal 1124 may receive a call purpose from the CRM system 1118 indicating that enterprise employee Y is going to be calling a user X at a specified time regarding user X's bank account with enterprise Y and user X's loan balances. The portal 1124 may send a pre-call notification or alert 1126 indicating the purpose, the enterprise, and the employee name prior to the phone call. When the outgoing phone call from the enterprise is detected by the call acquisition function 1122, a notification can be sent to the portal 1124 to determine if it matches the call information received from the CRM system 1118, and if a match occurs, a pre-call notification or alert can be sent from the portal 1124 to the user device 1004 to change the caller ID information 1128 by way of the stored contacts or call directory extension on the user device 1004 from an unverified caller to verified caller from enterprise X as discussed above. In at least one embodiment, the caller ID information and/or data for each outgoing phone number of the enterprise voice network 1102 may be stored on the device 1104 when an app or other contact information or data is integrated, interacts with, or is otherwise stored or activated on the user device 1104. It would be understood that firewall(s) 1130 may be utilized to protect data, information, connection, and/or networks from intrusive or exploitative attacks attempting to access user or enterprise data or information without authorization.

Figure 12:
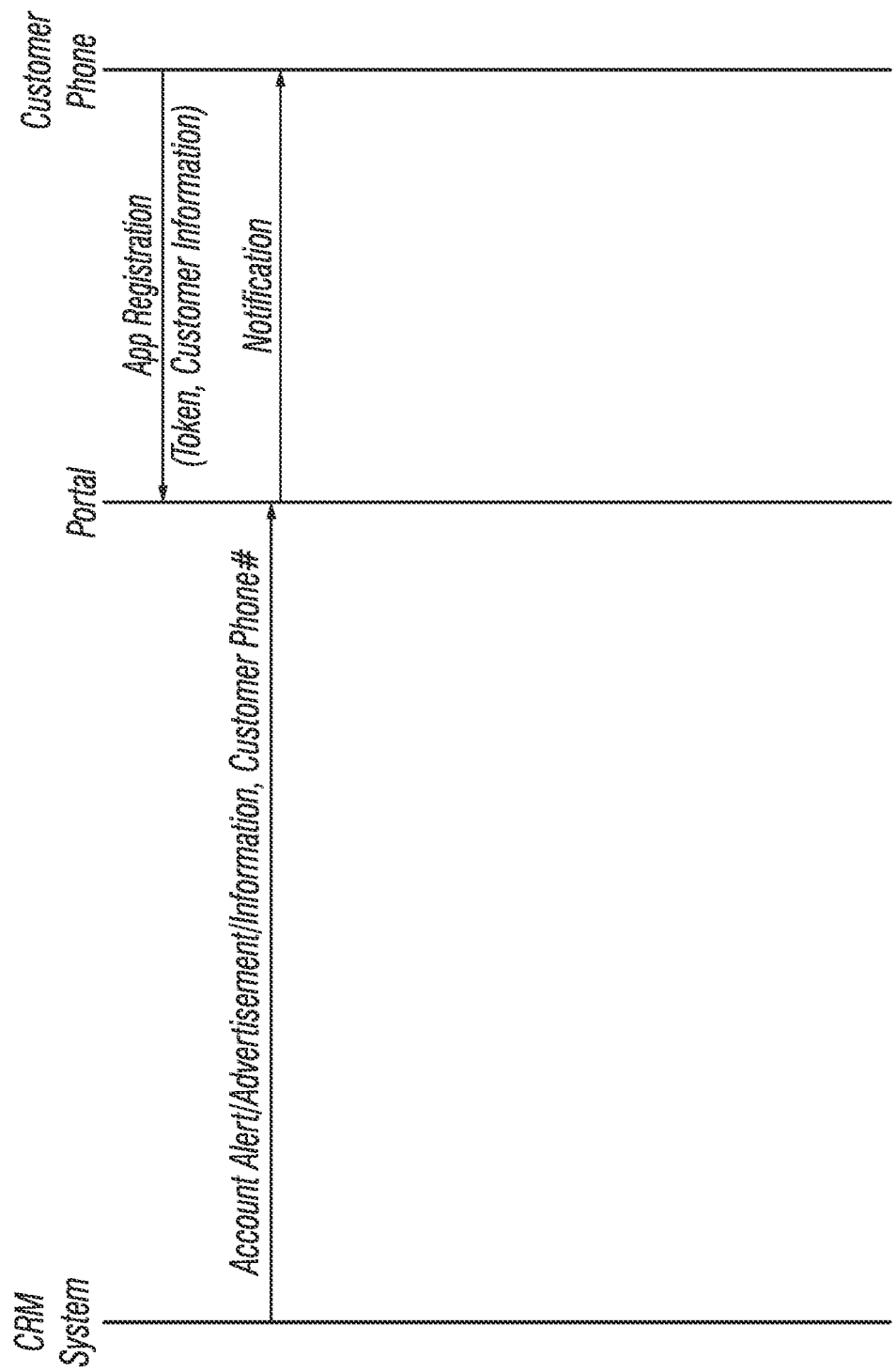
FIG. 12 is a transaction flow diagram for a method of use of the disclosed methods with alternative communication protocols in accordance with an embodiment of the disclosure.

FIG. 12 is a transaction flow diagram for a method of use of the disclosed methods with alternative communication protocols in accordance with an embodiment of the disclosure. Utilizing the systems and/or methods discussed above with regard to FIGS. 1-11, an enterprise can utilize similar principals in connection with alternative communication protocols such as short messaging services or video conference call technology that may not rely on traditional or commonly used caller identification features. Accordingly, a user may have a user device that it registers with the enterprise, causing the user's information to be loaded into a customer relationship management system. Many enterprises use customer relationship management systems to send advertisements or marketing information via short messaging services. However, users are becoming wary of these communications as they can be spoofed and used in an attempt to access private information.

In a similar manner as discussed above with respect to calls, an enterprise can use a portal to connect with and/or register a user device. This can be facilitated by the installation of an enterprise application or app on the user device. In at least one example, a token may be exchanged between the user device and portal, and that token can be used for later communications. When the enterprise customer relationship management system needs to send advertisements, marketing information, or otherwise communicate through non-voice communication protocols, a message can be sent through the portal to the user device to alert the user that a communication will be coming. In at least one embodiment, the communication can be sent to the user device directly from the portal utilizing the token, without any pre-communication notification to the user device. This allows the user to see the communication is coming from a verified source and is not a spoofed message.

Figure 13:
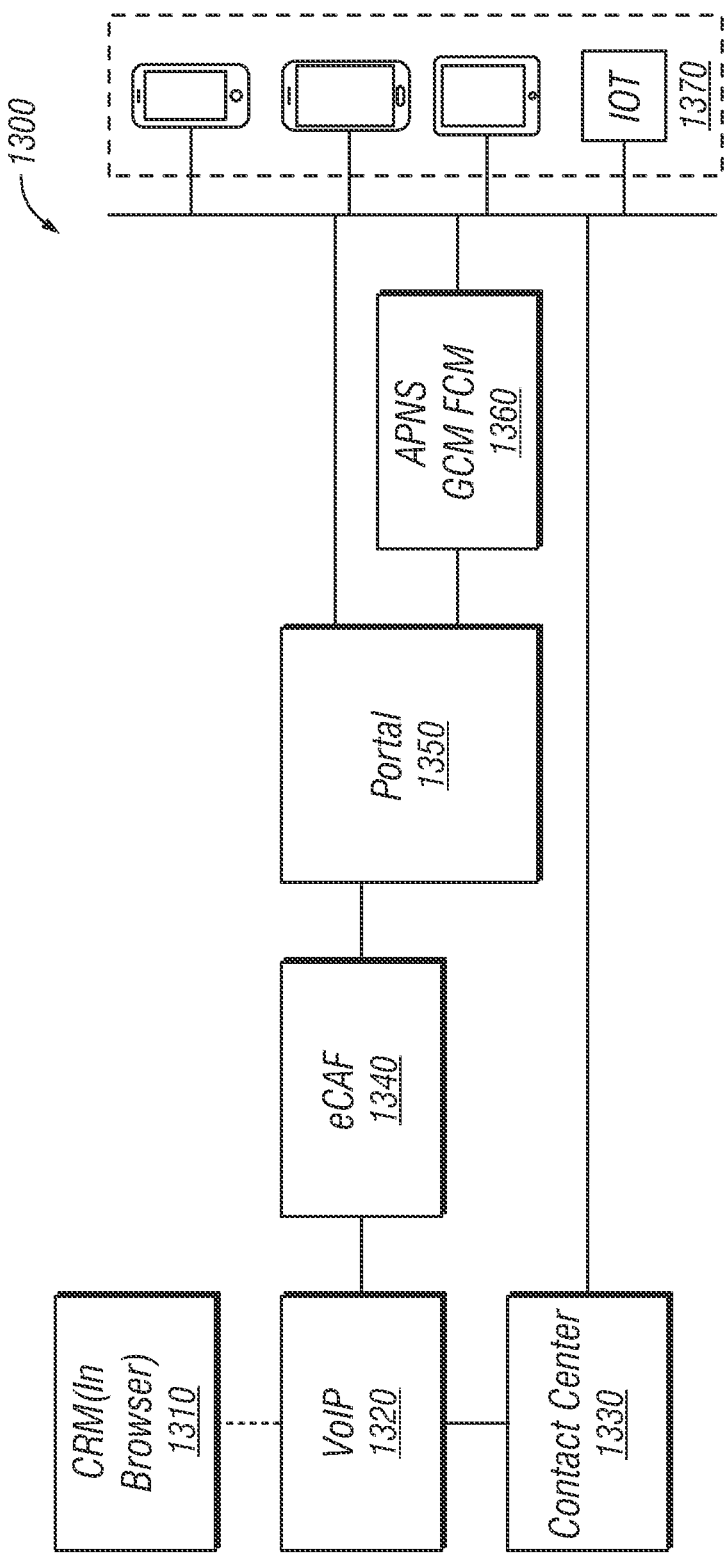
FIG. 13 is a block diagram of a solution architecture environment for caller ID verification using a mobile device in accordance with an embodiment of the disclosure.

Referring to FIG. 13, a block diagram depicting a solution architecture 1300 for call verification is illustrated. The solution architecture 1300 may include a calling device (alternatively a calling system) 1310, a calling platform 1320, a contact system (alternatively a contact center) 1330, a call monitoring system 1340, a processor (alternatively a server or portal) 1350, a messaging system 1360, and at least one user device 1370.

The calling device may be a cloud-based CRM platform 1310, which is a customer relationship management (CRM) database that maintains information about each customer and a corresponding profile along with the relationship with the enterprise. Examples of the contact information include but are not limited to name, phone number, address, personally identifiable information, and account information. In some configurations, the cloud-based CRM platform 1310 may only be accessible through a browser. It is advantageous to integrate the cloud-based CRM platform 1310 with computer telephony integration (CTI) for improving efficiency and optimizing time to dial phone numbers in the third-party vendor's calling platform 1320.

The calling platform may be a phone call application 1320 (e.g., an Internet Protocol (VoIP) client). The VoIP client 1320 is an application for generating phone calls over an internet connection. In some configurations, the solution architecture 1300 is configured to launch calls by the representative dialing in the numbers or by clicking on the customer's name or the phone number associated with that name. The contact system 1330 may be a cloud-based network infrastructure that enables the call setup and routing of the call to the appropriate destination carrier when the call is triggered from the VoIP client 1320. The call services are delivered by the contact center 1330 to the VoIP client 1320. The call monitoring system may be a cloud-based infrastructure 1340, which is an API gateway that enables the transmission of API requests. The cloud-based infrastructure 1340 validates the origination and also provides appropriate routing capabilities to the API requests that are processed by the backend infrastructure.

With continued reference to FIG. 13, the server 1350 may be a portal that hosts the functions within the solution architecture 1300. The portal 1350 may be any computing device or processor known in the art. In some configurations, the portal 1350 implements the registration process of all the apps installed on the user devices 1370 with the token information for communication, phone number of the customer, and the customer's name. After accepting the registration, the portal 1350 uploads the enterprise whitelist with the contact names saved initially as "Unverified call" or other similar language that would alert a user that the call has not been verified. This contact name can be used for the entire list of enterprise calling phone numbers. The portal 1350 may be configured to implement the reception of information from the cloud-based CRM platform 1310 about the purpose of the call for a particular customer prior to the call being made. The portal 1350 may also implement the function of generating a push notification upon reception of a notification from the cloud-based infrastructure 1340 about an outgoing call initiation from the enterprise. The portal 1350 matches the called number that came as a part of the notification from the cloud-based infrastructure 1340 with the customer information on the portal 1350 and accordingly sends a pre-call push notification with the purpose populated from the cloud-based CRM platform 1310 or the customer service representative. The pre-call push notification is sent over the cloud-based messaging platform 1360 using the token collected as a part of the app registration of the customer.

The cloud-based messaging platform 1360 may be provided by a third-party such as but not limited to Apple Push Notification service (APNs), Google Cloud Messaging (GCM), and/or Firebase Cloud Messaging (FCM). The cloud-based messaging platform 1360 receives push notifications from different backend infrastructure and processes them to be delivered to appropriate mobile apps that reside on the target mobile device 1370. The user devices 1370 may be different devices capable of receiving mobile calls and hosting the mobile apps. In some configurations, an app related to the cloud-based CRM platform 1310 is installed on the mobile devices 1370.

Figure 14:
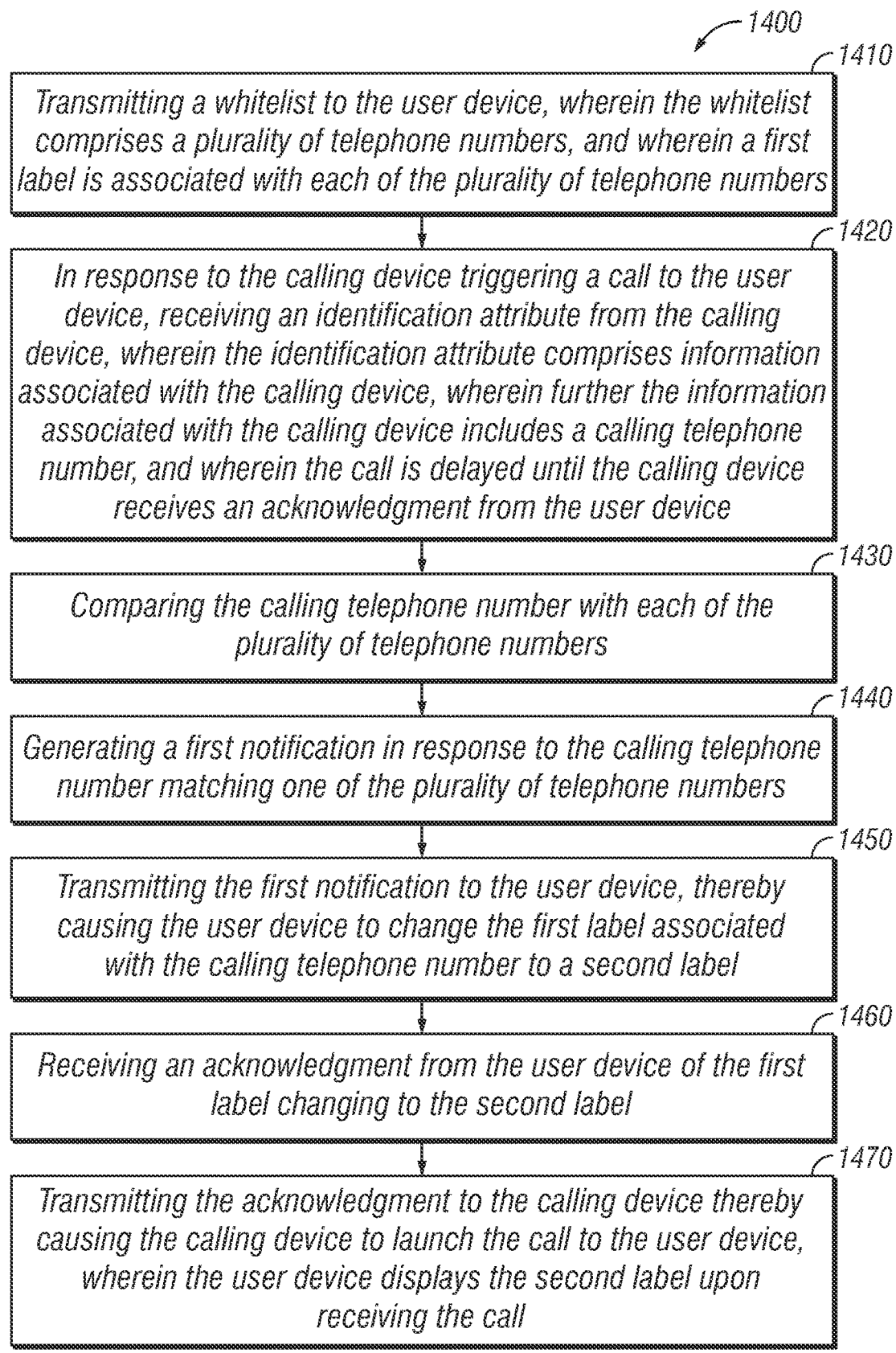
FIG. 14 is a flowchart of a method for caller identity verification in accordance with an embodiment of the disclosure.

Referring to FIG. 14, a flowchart 1400 of a process of verifying a caller identity is illustrated. The flowchart 1400 begins at step 1410 by a server transmitting a whitelist to the user device. The whitelist comprises a plurality of telephone numbers. A first label capable of notifying a user that a call is unverified is associated with each of the plurality of telephone numbers. At step 1420, in response to the calling device triggering a call to the user device, an identification attribute is received from the calling device. The identification attribute comprises information associated with the calling device. The information associated with the calling device includes a calling telephone number. The connection of the call to the user device is delayed until an acknowledgment is received from the user device as discussed below to allow time for the system to verify the call. At step 1430, the calling telephone number is compared to the plurality of telephone numbers and at step 1440 a first notification is generated in response to the calling telephone number matching one of the plurality of telephone numbers. At step 1450 the first notification is transmitted to the user device, which causes the user device to change the first label associated with the calling telephone number to a second label capable of notifying the user that the call has been verified.

At step 1460, an acknowledgment from the user device that the first label has been changed to the second label is received, and at step 1470, the acknowledgment is transmitted to the calling device. The calling device then launches the call to the user device upon receiving the acknowledgment and the user device displays the second label upon receiving the call. After the call is terminated, an end call notification is transmitted from the processor causing the user device to revert the second label back to the first label for the calling telephone number. In some configurations, the end call notification is transmitted after a few seconds (e.g., between one and five seconds) of the phone call terminating. If an end notification is not received by the user device, the mobile application may run an internal timer that accordingly reverts the second label back to the first label. It is advantageous to change the labels of the calling number because a scammer that has spoofed the calling phone number may not have the ability to cause the user device to change the labels of the calling number from "unverified" to "verified." Accordingly, the user device may present the spoofed call as an unverified call.

In an alternative embodiment, the whitelist along with an "unverified" label for each phone number may be stored in a call directory extension that is accessible by the user device. Upon receiving a notification of an incoming verified call, the user device dynamically creates a new contact associated with the calling telephone number in the device's user contacts. The contact comprises a label indicating that the call has been verified and may further contain the purpose of the call, and/or other identification attributes disclosed herein. An acknowledgment can then be sent from the user device allowing the call to be connected to the user device. When the call arrives, the phone will first look for a contact associated with the number and display the contact information that was just created. After the call is terminated, the user device deletes the contact information that was created prior to the call. Thus, if another unverified call arrives from the calling telephone number, the "unverified" label from the call directory extension will be displayed because there is no longer anything associated with the number in the user contacts. In some configurations, the deletion of the contact information is executed upon the expiration of a timer as described herein.

In an alternative embodiment, the method of using a server to verify telephone calls may include accessing a calling device through a browser. The click to call functionality is enabled by the browser extension in the calling device that recognizes the phone numbers in the displayed web page and accordingly places a call symbol next to these phone numbers. When the user of the calling device clicks on this number, the browser recognizes the clicked number and passes the call request onto the integrated calling platform. The browser extension executes code in response to the click. The click to call function enabled by the browser extension initiates the handover of the call from the browser to the associated calling platform. The calling device may be integrated with the calling platform as a computer telephony integration (CTI). It is advantageous to utilize a CTI because it improves the efficiency of dialing a telephone number by reducing the dial time. The CTI launches when the click to call function is executed. Executing the click to call function generates a call from the calling device to the associated calling platform. The contact center system enables the call setup and routes the calls to the appropriate destination carrier of the user device when the call is generated from the calling platform.

Figure 15:
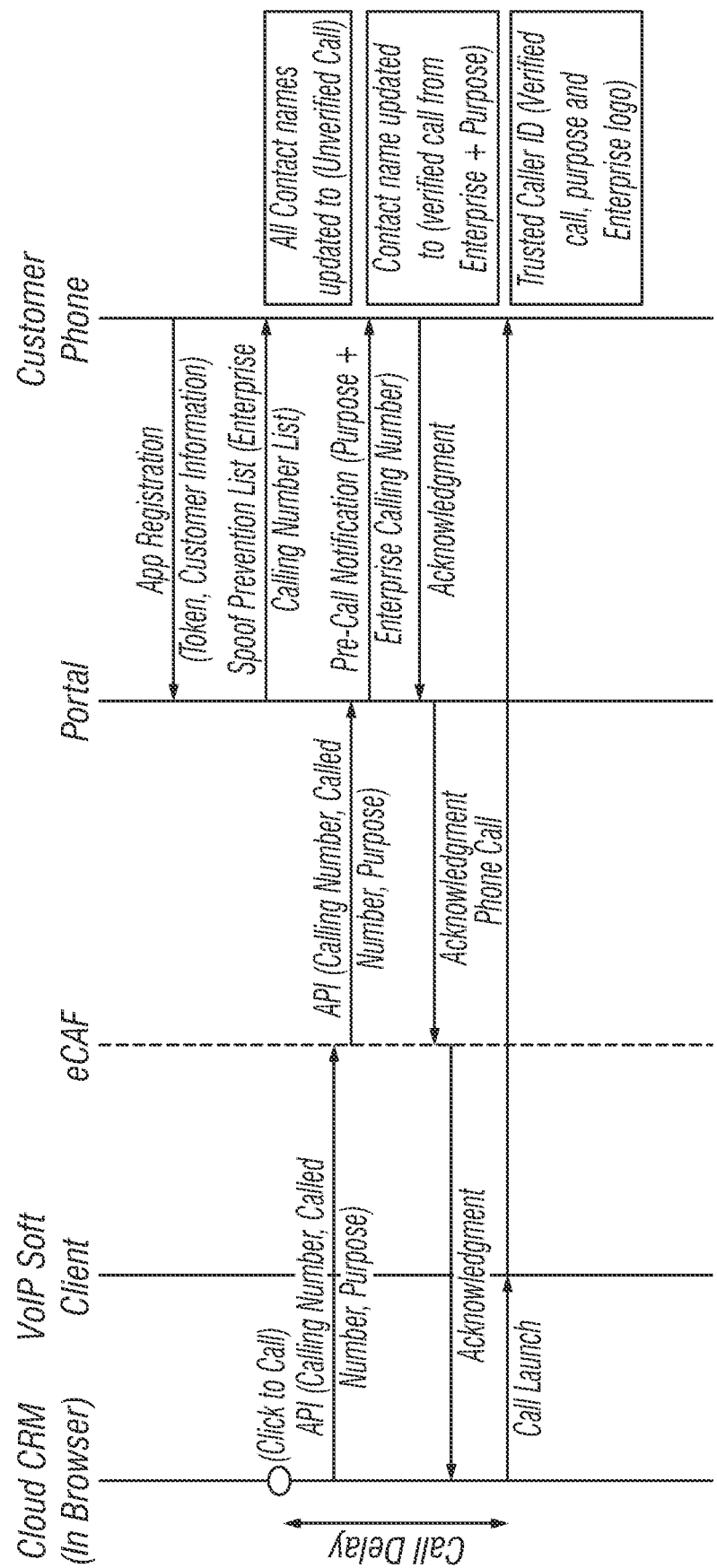
FIG. 15 is a transaction flow diagram for the method described with reference to FIG. 13 in accordance with an embodiment of the disclosure.

Referring to FIG. 15, a transaction flow diagram is illustrated. The transaction flow diagram depicts various transactions for an enhanced customer experience in receiving a legitimate call by the end customer. The processor receives registration information from the user device in response to the user installing the enterprise application on the user device. The registration information includes a token associated with the user device and a phone number of the user device. A token is a discrete identification of a particular application (e.g., enterprise application) registered on a particular user device. In some configurations, the processor translates the phone number of the user device to the associated token.

With continued reference to FIG. 15, the processor transmits a whitelist to the user device. The whitelist includes a plurality of telephone numbers that are approved for calling a particular user device. The whitelist further includes a plurality of labels that are associated with the plurality of telephone numbers. Initially, a first label from the plurality of labels is associated with each of the plurality of telephone numbers. The first label indicates that the associated telephone number is unverified. The contacts created with the telephone number of the whitelist may be stored in the processor and/or server with a contact's name labeled as "unverified."

A user associated with the calling device launches a browser to access the calling device and utilizes a click to call function enabled by the browser extension. The calling device is configured to delay the handover of the call from the calling application to the calling platform. This delay can be implemented by requiring the receipt of an acknowledgment from the user device being called. The delay in the handover enables communication of notifications to the user device so the call can be labeled as verified when the call is received. In one configuration, the processor receives an identification attribute from the calling device upon the calling device executing the click to call function. The identification attribute includes information associated with the calling device such as but not limited to the calling telephone number, the user telephone number, and/or the purpose of the call.

With continued reference to FIG. 15, the processor compares the calling telephone number with each of the plurality of telephone numbers of the whitelist and, upon locating a match, generates a first notification that is sent by the processor to the user device, thereby causing the user device to change the first label to a second label. The second label indicates that the calling telephone number is verified. The processor receives an acknowledgment from the user device of the first label changing to the second label. The processor transmits the acknowledgment to the calling device. Upon receiving the acknowledgment, the call is launched to the user device. The user device displays the second label upon receiving the call. It is advantageous for the calling device to receive the acknowledgment from the user device because receipt of the acknowledgment ensures the calling device that the user device has been notified of the incoming verified call. The receipt of the acknowledgment provides a user of the user device with trusted call identification and increases the likelihood that the user of the user device will answer the call. It is further advantageous because end users will have more trust in the call verification system by avoiding a false positive experience.

In some configurations, the calling device launching the call includes transmitting a second notification to the calling platform, which causes the calling platform to launch the call to the user device. When the user device receives the call, the application (e.g., enterprise application) causes the user device to display to the end user of the purpose of the call, the company logo of the caller, and the verification status. In yet another configuration, the calling platform launches the call to a contact system, which routes the call to the user device. In another configuration, the user device and the processor are in communication via a messaging system. The user device may transmit the registration information to the processor via a messaging system. The messaging system establishes a communication channel between the processor and the user device based on the token associated with the user device, thereby providing the user device access for communicating information with the server. The processor and user device communicate the whitelist, the first notification, and the acknowledgment via the communication channel. In some configurations, the notification is routed through a call monitoring system, which in turn relays the notification to the processor and/or user device.

After the call is terminated, the processor may transmit a notification to the user device, which causes the user device to change the second label associated with the calling telephone number back to the first label. In one configuration, the processor initiates a timer and upon expiration of the timer, the processor transmits the notification to the user device. Alternatively, the user device may initiate a timer and upon expiration of the timer, the user device changes the second label associated with the calling telephone number back to the first label. It is advantageous to change the second label back to the first label to ensure that the calling number is re-verified in subsequent calls. It is further advantageous for the user device to initiate a timer to ensure the second label is changed back to the first label in case the user device does not receive the notification from the processor.

Figure 16:
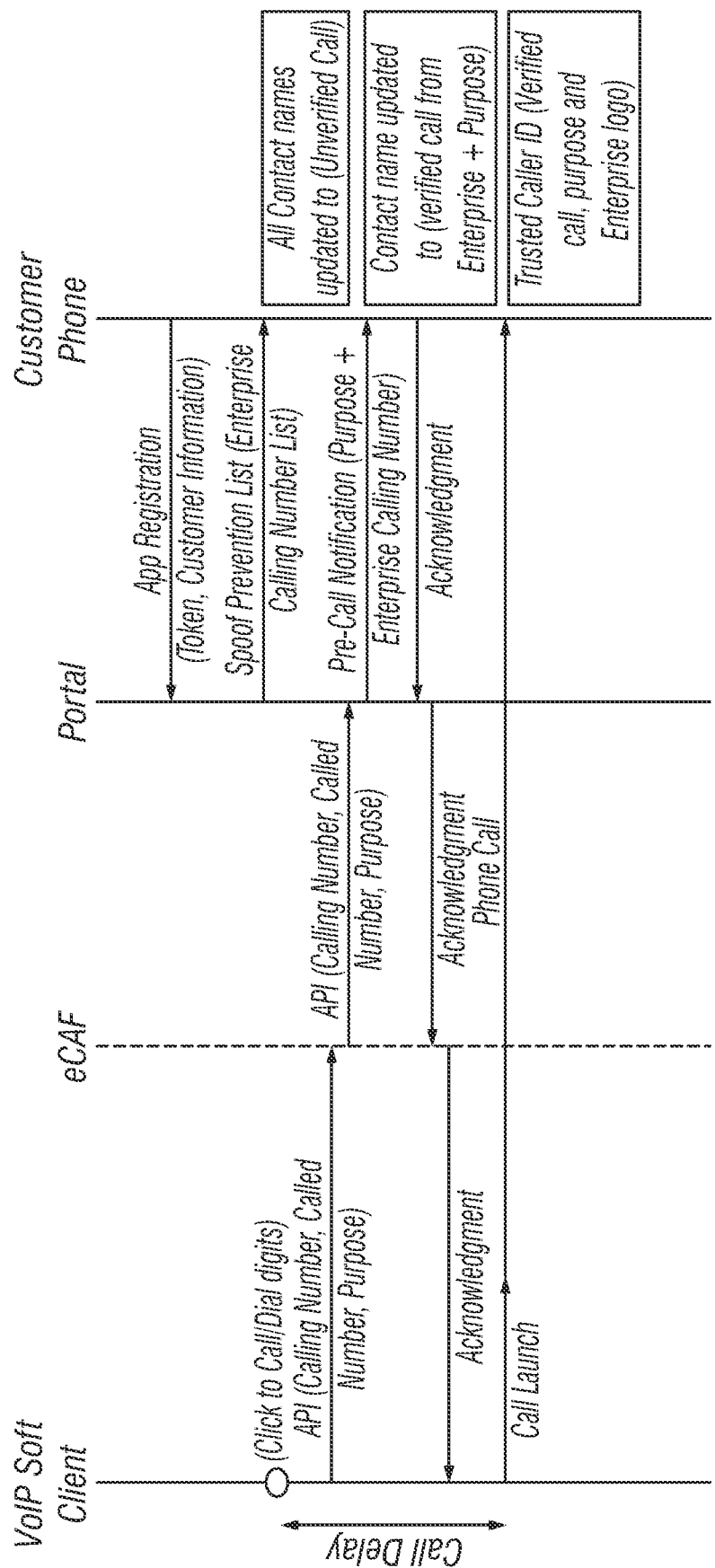
FIG. 16 is a transaction flow diagram for the method described with reference to FIG. 15 in accordance with an embodiment of the disclosure.

Referring to FIG. 16, a transaction flow diagram is illustrated. The transaction flow diagram depicts various transactions for an enhanced customer experience in receiving a legitimate call by the end customer when the call is launched directly from a third-party vendor's VoIP soft client. The transactions relate to instituting a delay upon executing a click to call function. The delay advantageously ensures the delivery of the notification of a legitimate call arrival to the targeted customer in a deterministic manner, which may be accomplished by the notification being acknowledged prior to the launch of the call and being handed over the VoIP client.

The customer phone, upon installation of the enterprise app, registers with the portal backend infrastructure. In this process, the phone number of the mobile device and the token provided by the third-party platform (APNs, GCM, and/or FCM) are registered with the portal. This token is a security key that allows the backend infrastructure to communicate with the third-party platform that, in turn, can forward the push notification to the appropriate mobile app on a customer phone. A discrete token is associated with a particular app registered on a particular mobile phone.

As a part of the registration process, the portal backend infrastructure downloads a list of whitelisted phone numbers from which an enterprise can initiate calls. The contacts created with the whitelisted numbers are stored with the contact's name as "Unverified." The customer representative launches a third-party vendor-based VoIP soft client to make the call to the end customer. The VoIP soft client is integrated with the ability to delay the call and transmit an API request with the calling number, called number, and purpose of the call. The API request is automatically triggered to inform the app on the customer's phone about the arrival of a legitimate call triggered from the enterprise.

The notification is routed through the eCAF which in turn relays it to the backend portal infrastructure. The portal utilizes the called number and translates it to an associated token. With this token information, the portal constructs the pre-call push notification that is transmitted to the third-party platform (APNs, GCM, and/or FCM). The third-party platform (APNs, GCM, and/or FCM) transmits the notification to the appropriate app on a particular customer phone. This pre-call push notification switches the name displayed for that particular calling number delivered in the push notification from "Unverified" to "Verified Call from Enterprise+Purpose" in the customer's phone. This notification is acknowledged directly to the portal which in turn transmits it back to the browser extension that transmitted the API request originally. Once the API request is acknowledged, this ensures the browser extension that the app on the customer phone has been notified about the call arrival, allowing the customer phone to provide a trusted caller ID experience.

With continued reference to FIG. 16, once the API request is acknowledged in the VoIP soft client, the VoIP soft client launches the call. When the call arrives on the customer phone, the mobile app establishes trust by informing the end customer about the purpose of the call along with the company logo and the verified call status. Establishing trust is advantageous because users avoid false positive experiences as the legitimate call is recognized as a good call, thereby encouraging the customer to answer the phone call.

The present disclosure may include a computing device or a mobile computing device that can include any of an application-specific integrated circuit (ASIC), a microprocessor, a microcontroller, a digital signal processor (DSP), a field-programmable gate array (FPGA), or equivalent discrete or integrated logic circuitry. In some examples, the system may include multiple components, such as any combination of one or more microprocessors, one or more microcontrollers, one or more DSPs, one or more ASICs, or one or more FPGAs. It would also be understood that multiples of the circuits, processors, or controllers could be used in combination, in tandem, or multithreading. Additionally, it would be understood that a browser or program could be implemented on a computing device, a mobile device or mobile computing device, such as a phone, a mobile phone, a smartphone, a cell phone, a tablet, a laptop, a mobile computer, a personal digital assistant ("PDA"), a processor, a microprocessor, a microcontroller, or other devices or electronic systems capable of connecting to a user interface and/or display system. A mobile computing device or mobile device may also operate on or in the same manner as the computing device disclosed herein or be based on improvements thereof. The components of the present disclosure may include any discrete and/or integrated electronic circuit components that implement analog and/or digital circuits capable of producing the functions attributed to the modules herein. For example, the components may include analog circuits, e.g., amplification circuits, filtering circuits, and/or other signal conditioning circuits. The components may also include digital circuits, e.g., combinational or sequential logic circuits, memory devices, etc. Furthermore, the modules may comprise memory that may include computer-readable instructions that, when executed cause the modules to perform various functions attributed to the modules herein.

Memory may include any volatile, non-volatile, magnetic, or electrical media, such as a random access memory (RAM), dynamic random access memory (DRAM), static random access memory (SRAM), read-only memory (ROM), non-volatile RAM (NVRAM), electrically-erasable programmable ROM (EEPROM), flash memory, hard disks, or any other digital media. Additionally, there may also be a tangible non-transitory computer readable medium that contains machine instructions, such as, a (portable or internally installed) hard drive disc, a flash drive, a compact disc, a DVD, a zip drive, a floppy disc, optical medium, magnetic medium, or any other number of possible drives or discs, that are executed by the internal logic of a computing device. It would be understood that the tangible non-transitory computer readable medium could also be considered a form of memory or storage media.

Additionally, it would be understood that users or customers would be the end user of an application that would allow for identification of spoofed calls to the user's phone, mobile device, or other communication device. Phone calls could also be video calls such as Zoom®, FaceTime®, Google® Chat, Skype®, or other similar services. A business could be called an enterprise, or store, but could be any company that offers goods or services to the public or private individuals directly or indirectly, electronically or with physical locations.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, the embodiments have been presented by way of example only, and not limitation. Thus, the breadth and scope of this disclosure should not be limited by any of the above-described exemplary embodiments but should be defined only in accordance with any claims and their equivalents issuing from this disclosure. Furthermore, the above advantages and features are provided in described embodiments but shall not limit the application of such issued claims to processes and structures accomplishing any of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure but should not be constrained by the headings set forth herein.

We claim:

1. A call identification system for verifying telephone calls, the call identification system comprising:
    a processor in communication with a calling device and a user device,
      wherein the processor:
      receives an identification attribute associated with the calling device triggering a call to the user device, wherein the identification attribute comprises information associated with the calling device, and wherein the information associated with the calling device includes a calling telephone number;
      compares the calling telephone number with a plurality of telephone numbers, wherein the plurality of telephone numbers have been stored on the user device with a first label associated with each of the plurality of telephone numbers;
      generates a first notification in response to the calling telephone number matching with one of the plurality of telephone numbers; and transmits the first notification to the user device, thereby causing the user device to change the first label associated with the calling telephone number to a second label;

receives an acknowledgment from the user device of the first label changing to the second label; and transmits the acknowledgment to the calling device, thereby causing the calling device to launch the call to the user device, wherein the user device displays the second label upon receiving the call.

2. The call identification system of claim 1, wherein the processor:

receives registration information from the user device, the registration information comprising a token associated with the user device; and transmits a whitelist to the user device for storage on the user device, wherein the whitelist comprises the plurality of telephone numbers.

3. The call identification system of claim 1, wherein the first label indicates that the information associated with the calling device is unverified, and wherein the second label indicates that the information associated with the calling device is verified.

4. The call identification system of claim 3, further comprising a calling platform in communication with the calling device and the user device, wherein the processor transmitting the acknowledgment to the calling device further causes the calling device to transmit a second notification to the calling platform, whereby the calling platform launches the call to the user device upon receiving the second notification.

5. The call identification system of claim 4, further comprising a contact system in communication with the calling device and the user device, wherein the contact system receives the call from the calling platform and routes the call to the user device.

6. The call identification system of claim 4, further comprising a call monitoring system in communication with the processor, calling device, and user device, wherein the call monitoring system:

receives the identification attribute from the calling device and routes the identification attribute to the processor;

receives the acknowledgment from the processor and routes the acknowledgment to the calling device; and validates an origination of the call based on the identification attribute and/or the acknowledgment.

7. The call identification system of claim 2, further comprising a messaging system in communication with the processor and the user device, wherein:

the messaging system receives the registration information from the user device and transmits the registration information to the processor, thereby establishing a communication channel between the processor and the user device based on the token associated with the user device;

the whitelist is communicated between the user device and the processor via the communication channel;

the processor transmits the first notification to the user device via the communication channel; and the user device transmits the acknowledgment to the processor via the communication channel.

8. The call identification system of claim 3, wherein:

the information associated with the calling device further includes a purpose of the call, and wherein the user device further displays the purpose of the call upon receiving the call;

the identification attribute further comprises information associated with the user device, wherein the information associated with the user device includes a user telephone number;

the token comprises communication information, the user telephone number, and a name associated with the user device;

the first notification indicates that the user device will receive the call;

the acknowledgment indicates that user device is ready for the calling system to launch the call;

the first label indicates that the information associated with the calling device is unverified; and the second label indicates that the information associated with the calling device is verified.

9. The call identification system of claim 1, wherein:

the plurality of telephone numbers is stored in a call directory extension of the user device;

the first notification to the user device causes the user device to create a contact associated with the calling telephone number;

after the contact is created, the call is connected to the user device; and after the call is connected, the call identification system causes the contact associated with the telephone number to be deleted.

10. The call identification system of claim 3, wherein in response to the call terminating, the processor transmits a second notification to the user device, thereby causing the user device to revert the second label associated with the calling telephone number back to the first label.

11. A method for using a server to verify telephone calls between a calling device and a user device, the method comprising:

in response to the calling device triggering a call to the user device, receiving an identification attribute from the calling device, wherein the identification attribute comprises information associated with the calling device, wherein further the information associated with the calling device includes a calling telephone number;

comparing the calling telephone number with a plurality of telephone numbers, wherein the plurality of telephone numbers is stored on the user device and a first label is associated with each of the plurality of telephone numbers;

generating a first notification in response to the calling telephone number matching one of the plurality of telephone numbers;

transmitting the first notification to the user device, thereby causing the user device to change the first label associated with the calling telephone number to a second label;

receiving registration information from the user device, wherein the registration information comprises a token associated with the user device;

receiving the acknowledgment from the user device of the first label changing to the second label; and transmitting the acknowledgment to the calling device, thereby causing the calling device to launch the call to the user device, wherein the user device displays the second label upon receiving the call.

12. The method of claim 11, wherein the first label indicates that the information associated with the calling device is unverified, and wherein the second label indicates that the information associated with the calling device is verified.

13. The method of claim 11, wherein:

receiving the registration information comprises receiving the registration information via a messaging system, whereby a communication channel is established between a processor and the user device based on the token associated with the user device;

a whitelist comprising the plurality of telephone numbers is communicated through the communication channel;

the first notification is communicated through the communication channel;

the processor receives the acknowledgment from the user device through the communication channel and transmits the acknowledgment to the calling device.

14. The method of claim 13, wherein:

the whitelist is stored in a call directory extension;

the processor transmitting the first notification to the user device further causes the user device to create a contact associated with the calling telephone number; and in response to the call terminating or the user device receiving a security notification, transmitting a second notification to the user device, thereby causing the user device to initiate a timer and upon expiration of the timer the user device:

deletes the contact associated with the calling telephone number, and reverts the second label back to the first label for the calling telephone number stored in the call directory extension.

15. The method of claim 14, wherein:

in response to the call terminating, the processor initiates a timer; and upon the timer expiring, the processor transmits the second notification to the user device.

16. A call identification system for verifying telephone calls, the call identification system comprising:

a processor in communication with a calling device and a user device, wherein the processor:

receives an identification attribute as a result of the calling device triggering a call to the user device, wherein the identification attribute comprises information associated with the calling device, and wherein the information associated with the calling device includes a calling telephone number;

compares the calling telephone number with one or more sets of telephone numbers, wherein an unverified label is associated with each of the one or more sets of telephone numbers;

generates a first notification in response to the calling telephone number matching with a telephone number from the one or more sets of telephone numbers; and transmits the first notification to the user device, thereby causing the user device to change the unverified label associated with the calling telephone number to a verified label;

receives an acknowledgment from the user device of the unverified label changing to the verified label; and transmits the acknowledgment to the calling device, thereby causing the calling device to launch the call to the user device, wherein the user device displays the verified label upon receiving the call.

17. The call identification system of claim 16, wherein:

a first set of telephone numbers of the one or more sets of telephone numbers is stored on the user device.

18. The call identification system of claim 17, wherein after the call is connected, the call identification system causes the user device to change the verified label associated with the calling telephone number to the unverified label.

19. The call identification system of claim 16, wherein:

a first set of telephone numbers of the one or more sets of telephone numbers is stored in a call directory extension of the user device;

upon receiving the first notification, the call identification system causes the user device to create a contact associated with the calling telephone number; and after the contact is created, the call is connected to the user device.

20. The call identification system of claim 19, wherein after the call is connected, the call identification system causes:

the contact associated with the telephone number to be deleted, and the verified label associated with the calling telephone number to change to the unverified label in the call directory extension.

21. A method for using a server to verify telephone calls between a calling device and a user device, the method comprising:

in response to the calling device triggering a call to the user device, receiving an identification attribute from the calling device, wherein the identification attribute comprises information associated with the calling device, wherein further the information associated with the calling device includes a calling telephone number;

comparing the calling telephone number with a plurality of telephone numbers, wherein the plurality of telephone numbers is stored on the user device and a first label is associated with each of the plurality of telephone numbers;

generating a first notification in response to the calling telephone number matching one of the plurality of telephone numbers;

transmitting the first notification to the user device, thereby causing the user device to change the first label associated with the calling telephone number to a second label;

wherein transmitting the acknowledgment to the calling device further causes the calling device to transmit a second notification to a calling platform, whereby the calling platform launches the call to the user device upon receiving the second notification.

22. The method of claim 21, wherein a call monitoring system:

receives the identification attribute from the calling device and routes the identification attribute to a processor;

receives the acknowledgment from the processor and routes the acknowledgment to the calling device; and validates an origination of the call based on the identification attribute.

23. The method of claim 21, wherein:

the information associated with the calling device further includes a purpose of the call, wherein the user device further displays the purpose of the call upon receiving the call;

the identification attribute further comprises information associated with the user device, wherein the information associated with the user device includes a user telephone number;

the token comprises communication information, the user telephone number, and a name associated with the user device;

the first notification indicates that the user device will receive the call;

the second notification indicates that the calling device is launching the call;

the first label indicates that the information associated with the calling device is unverified; and the second label indicates that the information associated with the calling device is verified.

\* \* \* \* \*